US007929027B2

(12) United States Patent
Okamoto et al.

(10) Patent No.: US 7,929,027 B2
(45) Date of Patent: Apr. 19, 2011

(54) IMAGE MANAGEMENT METHOD

(75) Inventors: Satoru Okamoto, Asaka (JP); Mikio Watanabe, Asaka (JP); Satoshi Nakamura, Asaka (JP); Toshiharu Ueno, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 533 days.

(21) Appl. No.: 11/965,549

(22) Filed: Dec. 27, 2007

(65) Prior Publication Data

US 2008/0158384 A1    Jul. 3, 2008

(30) Foreign Application Priority Data

Dec. 27, 2006   (JP) ................................. 2006-353207

(51) Int. Cl.
 *H04N 5/76* (2006.01)
 *H04N 13/00* (2006.01)
 *G06T 15/00* (2011.01)

(52) U.S. Cl. .................. 348/231.2; 348/42; 345/419

(58) Field of Classification Search ............... 348/231.2, 348/231.3, 231.6; 345/419, 653, 654
See application file for complete search history.

(56) References Cited

U.S. PATENT DOCUMENTS

| 6,760,020 | B1 * | 7/2004 | Uchiyama et al. ............ 345/419 |
| 7,064,754 | B2 * | 6/2006 | Iizuka et al. .................. 345/419 |
| 2004/0070673 | A1 * | 4/2004 | Nakamura .................. 348/207.2 |
| 2005/0238224 | A1 * | 10/2005 | Okutsu et al. ................ 382/154 |
| 2005/0248561 | A1 * | 11/2005 | Ito et al. ...................... 345/419 |
| 2006/0010158 | A1 | 1/2006 | Yoshida |
| 2007/0036444 | A1 * | 2/2007 | Yoshida ...................... 382/232 |

FOREIGN PATENT DOCUMENTS

| EP | 1 591 903 A1 | 11/2005 |
| EP | 1 742 488 A1 | 1/2007 |
| EP | 1 783 639 A1 | 5/2007 |
| JP | 2001-222083 A | 8/2001 |
| JP | 2004-120165 A | 4/2004 |
| JP | 2004-129186 A | 4/2004 |
| JP | 2004-235789 A | 8/2004 |
| JP | 2004-343549 A | 12/2004 |
| JP | 2004-356997 A | 12/2004 |
| JP | 2005-094145 A | 4/2005 |
| JP | 2005-128897 A | 5/2005 |
| JP | 2005-149483 A | 6/2005 |
| JP | 2005-229291 A | 8/2005 |

(Continued)

OTHER PUBLICATIONS

Explanation of circumstances concerning accelerated examination, submitted Sep. 13, 2010, in corresponding JP Application No. 2006-353207, 16 pages in English and Japanese.

*Primary Examiner* — Lin Ye
*Assistant Examiner* — Trung Diep
(74) *Attorney, Agent, or Firm* — Sughrue Mion, PLLC

(57) ABSTRACT

A method for managing an image photographed by two or more image pickup devices corresponding to two or more viewpoints, comprises: storing a 2D image photographed by the two or more image pickup devices, with identifier indicating that the image is two-dimensional; and storing a 3D image photographed by the two or more image pickup devices, with identifier indicating that the image is three-dimensional. Hence, it becomes possible to search and display quickly an object 2D or 3D image by performing an access per folder.

13 Claims, 11 Drawing Sheets

FOREIGN PATENT DOCUMENTS

| | | |
|---|---|---|
| JP | 2005-311984 A | 11/2005 |
| JP | 2005-311985 A | 11/2005 |
| JP | 2005313327 A | 11/2005 |
| JP | 2006-157178 A | 6/2006 |
| WO | 03/092303 A1 | 11/2003 |
| WO | 2005/041043 A1 | 5/2005 |
| WO | 2005/115016 A1 | 12/2005 |

* cited by examiner

FIG.6
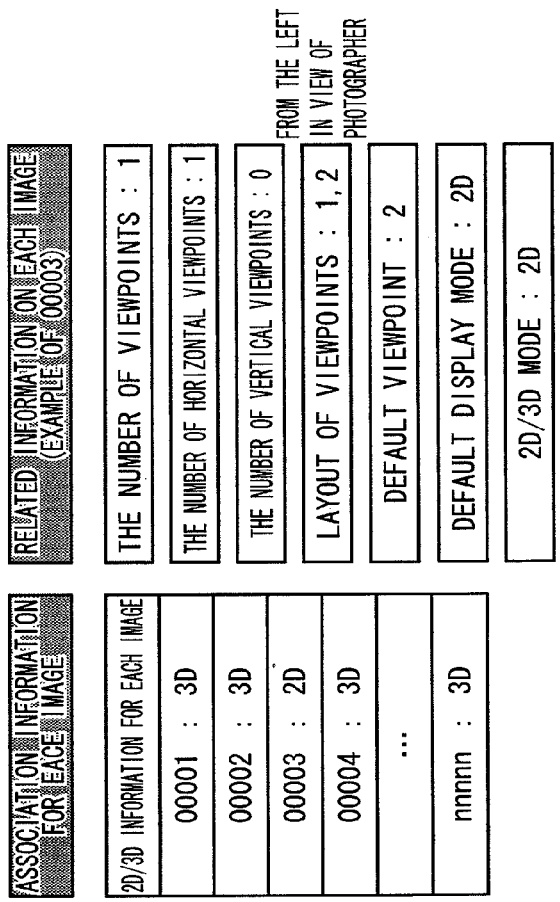
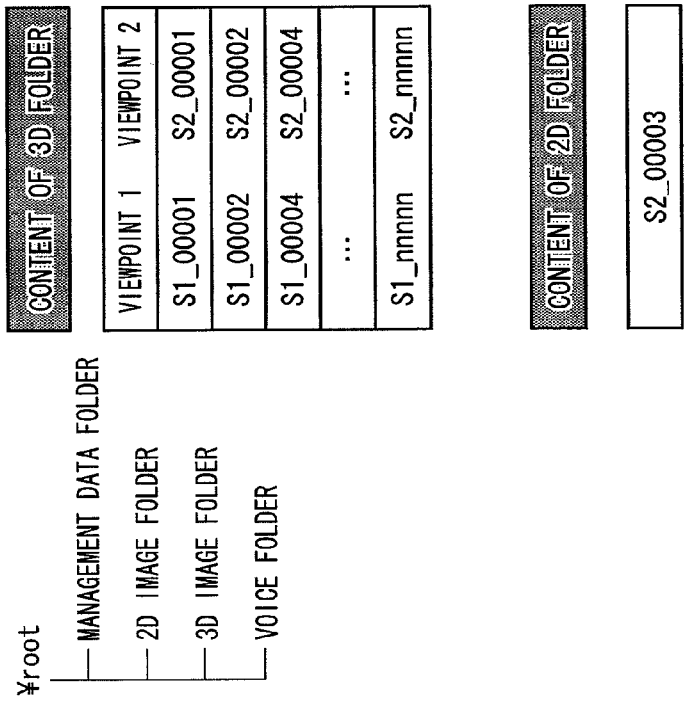

IMAGE MANAGEMENT METHOD

BACKGROUND OF THE INVENTION

1. Field of the Invention

The present invention relates to an image management method, and in particular, relates to an image management method in a digital camera.

2. Description of the Related Art

Heretofore, a digital camera (hereinafter, this is also called as a compound eye digital camera) equipped with two or more image pickup systems is known (e.g., refer to Japanese Patent Application Laid-Open No. 2005-149483). In the digital camera described in Japanese Patent Application Laid-Open No. 2005-149483, one set of images with each parallax is obtained from two or more image pickup systems, and this set of images are stored in one file.

In addition, there are the following patent documents (Japanese Patent Application Laid-Open Nos. 2001-222083, 2004-343549, 2005-94145, 2004-129186, and 2005-311985 respectively) as those relating to the present application.

Nevertheless, like Japanese Patent Application Laid-Open No. 2005-149483, in the case of storing them in one file, there is a problem that it takes considerable time to search and display a desired image because all data has to be read out when displaying a set of 2D images (or when displaying an image at a specific viewpoint).

SUMMARY OF THE INVENTION

The present invention is made in view of such a situation, and aims at quickly searching and displaying an object image from images photographed by two or more image pickup systems.

The present invention is made in order to solve the aforementioned problem, and a first aspect of the present invention is a method for managing an image photographed by two or more image pickup devices corresponding to two or more viewpoints, comprising: storing a 2D image photographed by the two or more image pickup devices, with identifier indicating that the image is two-dimensional; and storing a 3D image photographed by the two or more image pickup devices, with identifier indicating that the image is three-dimensional.

According to the first aspect of the present invention, 2D images are stored in the 2D image folder, and 3D images are stored in the 3D image folder.

Hence, it becomes possible to search and display quickly an object 2D or 3D image by performing an access per folder. In addition, it becomes easy to perform file management. Furthermore, since an identifier which expresses that it is a 2D image or a 3D image is also stored, even if the image is moved, for example, to another folder, it becomes possible to judge whether it is a 2D image or a 3D image.

A second aspect of the present invention is a method for managing an image photographed by two or more image pickup devices corresponding to two or more viewpoints, comprising storing images photographed by the two or more image pickup devices, in a plurality of folders provided for each viewpoint, with related information showing relation between viewpoints and default viewpoint information.

According to the second aspect of the present invention, by storing images photographed by two or more image pickup devices (two or more viewpoints) in dedicated folders which are provided for each viewpoint.

Hence, it becomes possible to search and display quickly an image at an object viewpoint by performing an access per folder.

In addition, since according to this aspect, by storing related information with another viewpoint and default viewpoint information, a viewpoint switching also becomes easy.

A third aspect of the present invention is, an image recording, reproducing, or editing apparatus comprises: a 2D and 3D display device; a first storage device which classifies and stores an image data into a 2D or 3D image folder; a second storage device, when the image data is a 3D image data at a plurality of viewpoints, which classifies and separately stores the image data into a plurality of folders for each viewpoint; a first search device which searches image data in the 2D image folder; a second search device which searches an attribute of image data in the 3D image folder; a 2D and 3D display mode setting device; a 2D and 3D mode display switching device; a third search device which searches an image data from the 2D or 3D image folder when the 2D or 3D display mode is set, respectively; a first thumbnail displaying device which displays one or more thumbnails of the searched image data; a second thumbnail displaying device which displays an object thumbnail among the displayed thumbnails in 2D or 3D; a third storage device which separately stores an image data into the plurality of folders for each viewpoint when editing, integrates the separately stored image data into one image data after the editing, and stores the image data in a recording medium.

According to the third aspect of the present invention, by separately storing images in 2D and 3D image folders, a search of 3D images becomes easy. For this reason, it becomes possible to reduce processing necessary for recording and displaying an image, and to reduce time for the display.

In addition, since the apparatus can also classify and store images in the folders for every viewpoint, a search for every viewpoint becomes easy. For this reason, processing necessary for recording and displaying an image is reduced and display for every viewpoint becomes easy.

A fourth aspect of the present invention, an image recording method comprises: a step of setting a recording mode of a 2D or 3D image; a step of confirming presence of a 2D image folder, a 3D image folder, or a plurality of folders for each viewpoint, and creating the folder if the folder does not exist; a step of storing an image into the 2D or 3D folder according to the 2D or 3D mode; a step of separately storing an image into the plurality of folders for each viewpoint, when the image is a 3D image at a plurality of viewpoints; a step of storing attribution information of 2D or 3D; a step of recording information for associating the separately stored images at the plurality of viewpoints; and a step of recording a default viewpoint.

According to the fourth aspect of the present invention, since this aspect separately stores an image into a 2D or 3D folder according to a 2D or 3D display mode, a search of a 3D image becomes easy. For this reason, it becomes possible to reduce processing necessary for recording and displaying an image, and to reduce time for the display.

In addition, since this aspect separately stores the image into folders for each viewpoint in the case of two or more viewpoints in a 3D mode, a search for every viewpoint becomes easy. For this reason, processing necessary for recording and displaying an image is reduced and display for every viewpoint becomes easy.

A fifth aspect of the present invention, an image reproducing method, comprising: a step of obtaining a 2D or 3D display mode; a step of switching the 2D or 3D display mode;

a step of searching an image from a 2D or 3D image folder when setting the 2D or 3D display mode; a step of displaying one or more thumbnails of the searched image; a step of selecting an object image from the displayed thumbnails; and a step of displaying the selected image in 2D or 3D.

According to the fifth aspect of the present invention, since this aspect searches an image from a 2D or 3D image folder when setting as a 2D or 3D display mode, in the case of 3D display, it is possible to display the 3D image folder preferentially. For this reason, time and effort of switching becomes unnecessary.

A sixth aspect of the present invention, an image reproducing method, comprises: a step of obtaining a 2D or 3D display mode; a step of switching the 2D or 3D display mode; a step of displaying one or more thumbnails of images at respective viewpoints; a step of selecting an image to be displayed; a step of reading default viewpoint information of the selected image data; a step of reading and displaying the selected image at a default viewpoint in the case of the 2D display mode; a step of reading the number of displayable viewpoints in the case of the 3D display mode; a step of reading and displaying the images at all viewpoints of the selected image data when images at all viewpoints are displayable; a step of reading and displaying the same number of images as the displayable viewpoints of the selected image data, with the image at the default viewpoint centered when images at all viewpoints are not displayable.

According to the sixth aspect of the present invention, since this aspect reads and displays an image at a default viewpoint in the case of a 2D mode, time and effort of selection is unnecessary, and it is possible to display easily an image which a camera person or an editor wants to show.

In addition, since this aspect can read and display a displayable viewpoint number of images with a default viewpoint centered in the case of a 3D mode, selection is unnecessary and it becomes possible to display them easily.

A seventh aspect of the present invention, an image reproducing method comprises a step of reading default viewpoint information of a selected image; and a step of reading and displaying the image at a default viewpoint in the case of a 2D mode.

According to the seventh aspect of the present invention, since this aspect reads and displays an image at a default viewpoint in the case of a 2D mode, time and effort of selection is unnecessary, and it is possible to display easily an image which a camera person or an editor wants to show.

An eighth aspect of the present invention, an image reproducing method, further comprises: a step of reading default viewpoint information of a selected image data; a step of reading the number of displayable viewpoints in the case of a 3D mode; a step of reading and displaying images at all viewpoints of the selected image data when the images at all viewpoints are displayable; and a step of reading and displaying the same number of images of the selected image data as the displayable viewpoints with an image at the default viewpoint centered when images at all viewpoints are not displayable.

According to the eighth aspect of the present invention, since this aspect can read and display the same number of images as displayable viewpoints with an image at a default viewpoint centered, in the case of a 3D mode, selection is unnecessary and it becomes possible to display them easily.

A ninth aspect of the present invention, an image editing method comprises: a step of selecting an image to be edited; a step of confirming whether the selected image is separately stored for each viewpoint in a plurality of folders; a step of separately storing one file into the plurality of folders for each viewpoint when the file is not separated for each viewpoint; a step of reading images in the folders for each viewpoint at the time of editing and writing the images after the editing; a step of integrating the images in the plurality of folders for each viewpoint into one file to record the file in a recording medium at the time of an end of the editing; and a step of writing header information of the file.

According to the ninth aspect of the present invention, since this aspect separately stores images at each viewpoint into folders provided for each viewpoint, a user can confirm images every viewpoint, and edit, thereby the user can easily edit such as control of depth feel, and the like.

Thus, according to the aspects of the present invention, it becomes possible to quickly search and display an object image from among images photographed by two or more image pickup systems.

BRIEF DESCRIPTION OF THE DRAWINGS

FIG. 6 is an example of dividing an image folder into a 2D image folder and a 3D image folder;

DETAILED DESCRIPTION OF THE PREFERRED EMBODIMENTS

Hereafter, a digital camera (photographing apparatus) according to a first embodiment of the present invention will be described with referring to drawings.

Figure 1:
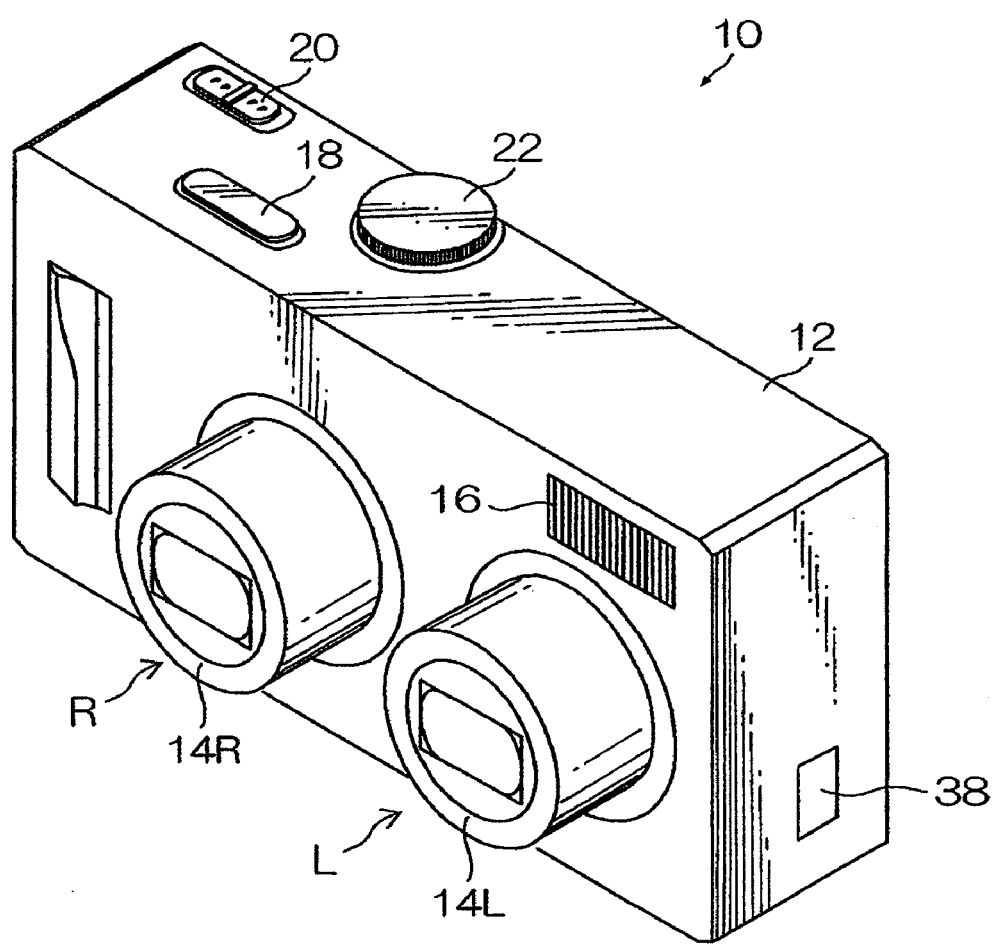
FIG. 1 is a front perspective view showing external construction of a digital camera according to a first embodiment of the present invention.
Figure 2:
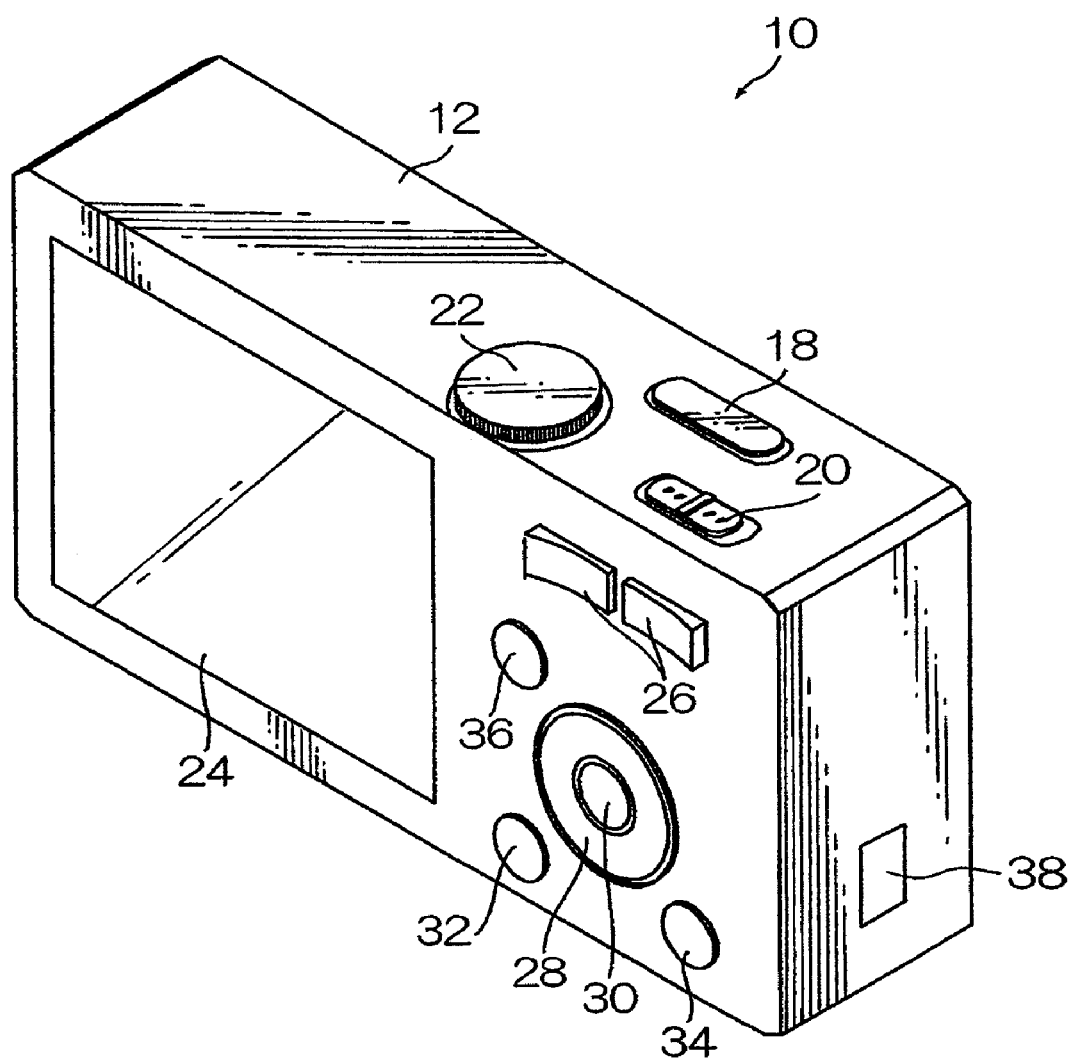
FIG. 2 is a back perspective view showing external construction of the digital camera according to the first embodiment of the present invention.

FIG. 1 is a front perspective view showing external construction of a digital camera which is a first embodiment of the present invention, and FIG. 2 is a back perspective view showing external construction of the digital camera which is the first embodiment of the present invention.

A digital camera 10 of this embodiment is a digital camera equipped with two or more (equivalent to a compound eye digital camera of the present invention) (two devices are shown in FIG. 1 as an example) image pickup devices (these are also called image pickup systems), and can photograph the same subject from two or more viewpoints (two of right and left viewpoints are shown in FIG. 1 as an example).

A camera body 12 of the digital camera 10 is formed in a rectangular box shape, and a pair of image taking lenses 14R and 14L, a strobe 16, and the like are provided in its front as shown in FIG. 1. In addition, a shutter button 18, a power supply/mode switch 20, a mode dial 22, and the like are provided in a top face of the camera body 12.

On the other hand, a monitor 24, a zoom button 26, a cross button 28, a MENU/OK button 30, a DISP button 32, a BACK button 34, a macro button 36, and the like are provided in a back face of the camera body 12 as shown in FIG. 2.

In addition, although not illustrated, a tripod screw hole, a battery cover which can be opened and closed freely, and the like are provided in a bottom face of the camera body 12, and a battery storage chamber for containing a battery, a memory card slot for mounting a memory card, and the like are provided inside the battery cover.

The pair of right and left image taking lenses 14R and 14L each are constructed of a collapsible mount type zoom lens, and have a macro photographing function (close photographing function). These image taking lenses 14R and 14L protrude from the camera body 12 respectively when a power supply of the digital camera 10 is turned on.

In addition, about the zoom mechanism, a collapsing mechanism, and a macro photographing mechanism in an image taking lens, since they are publicly-known techniques, descriptions about their specific construction will be omitted here.

The strobe 16 is constructed of a xenon tube and emits light if needed, that is, in the case of photographing of a dark subject, a backlit subject, or the like.

The shutter button 18 is constructed of a two-step stroke type switch whose functions are so-called "half press" and "fill press." When this shutter button 18 is half-pressed at the time of still image photographing (for example, at the time of selecting a still image photographing mode with the mode dial 22, or selecting the still image photographing mode from a menu), the digital camera 10 performs photographing preparation process, that is, respective processing of AE (Automatic Exposure), AF (Auto Focus), and AWB (Automatic White Balance), and when fully-pressed, it performs photographing and recording processing of an image. In addition, when this shutter button 18 is fully-pressed at the time of moving image photographing (for example, at the time of selecting a moving image photographing mode with the mode dial 22, or at the time of selecting the moving image photographing mode from a menu), photographing of moving images is started, and the photographing is completed when it is fully presses again. In addition, depending on setup, it is possible to perform photographing of moving images for the shutter button 18 being fully pressed, and to complete photographing when full press is released. Furthermore, it is also sufficient to provide a shutter button only for still image photographing, and a shutter button only for moving image photographing.

While functioning as a power switch of the digital camera 10, the power supply/mode switch 20 functions as a switching device which switches a reproduction mode and a photographing mode of the digital camera 10, and is provided slidably among an "OFF position", a "reproduction position", and a "photographing position." When this power supply/mode switch 20 is located in the "reproduction position", the digital camera 10 is set in the reproduction mode, and when being located in the "photographing position", it is set in the photographing mode. Moreover, the power supply is turned off when the switch is located in the "OFF position."

The mode dial 22 is used for setting the photographing mode. This mode dial 22 is rotatably provided in a top face of the camera body 12, and is provided settably in a "2D still image position", a "2D moving image position", a "3D still image position", and a "3D moving image position" by a click mechanism which is not shown. The digital camera 10 is set in the 2D still image photographing mode, in which a 2D still image is photographed, by this mode dial 22 being set in the "2D still image position", and a flag which indicates that it is in the 2D mode is set in a 2D/3D mode switching flag 168. In addition, by this mode dial 22 being set in the "2D moving image position", the digital camera 10 is set in the 2D moving image photographing mode in which 2D moving images are photographed, and a flag which indicates that it is in the 2D mode is set in the 2D/3D mode switching flag 168.

In addition, by the mode dial 22 being set in the "3D still image position", the digital camera 10 is set in the 3D still image photographing mode in which a 3D still image is photographed, and a flag which indicates that it is in the 3D mode is set in the 2D/3D mode switching flag 168. Furthermore, by the mode dial 22 being set in the "3D moving image position", the digital camera 10 is set in the 3D moving image photographing mode in which 3D moving images are photographed, and a flag which indicates that it is in the 3D mode is set in a 2D/3D mode switching flag 168. A CPU 110 mentioned later grasps which of the 2D mode or 3D mode is set in with reference to this 2D/3D mode switching flag 168.

The monitor 24 is a display apparatus, such as a color liquid crystal panel, in which a so-called lenticular lens which has a semicylindrical lens group is placed in its front face. This monitor 24 is used as a GUI at the time of various setups while used as an image display unit for displaying a photographed image. In addition, at the time of photographing, it is used as an electronic finder on which an image caught with an image pickup element is given pass-through display (real-time display).

Here, a mechanism that stereoscopic vision display becomes possible on the monitor 24 will be described with referring to drawings.

Figure 11:
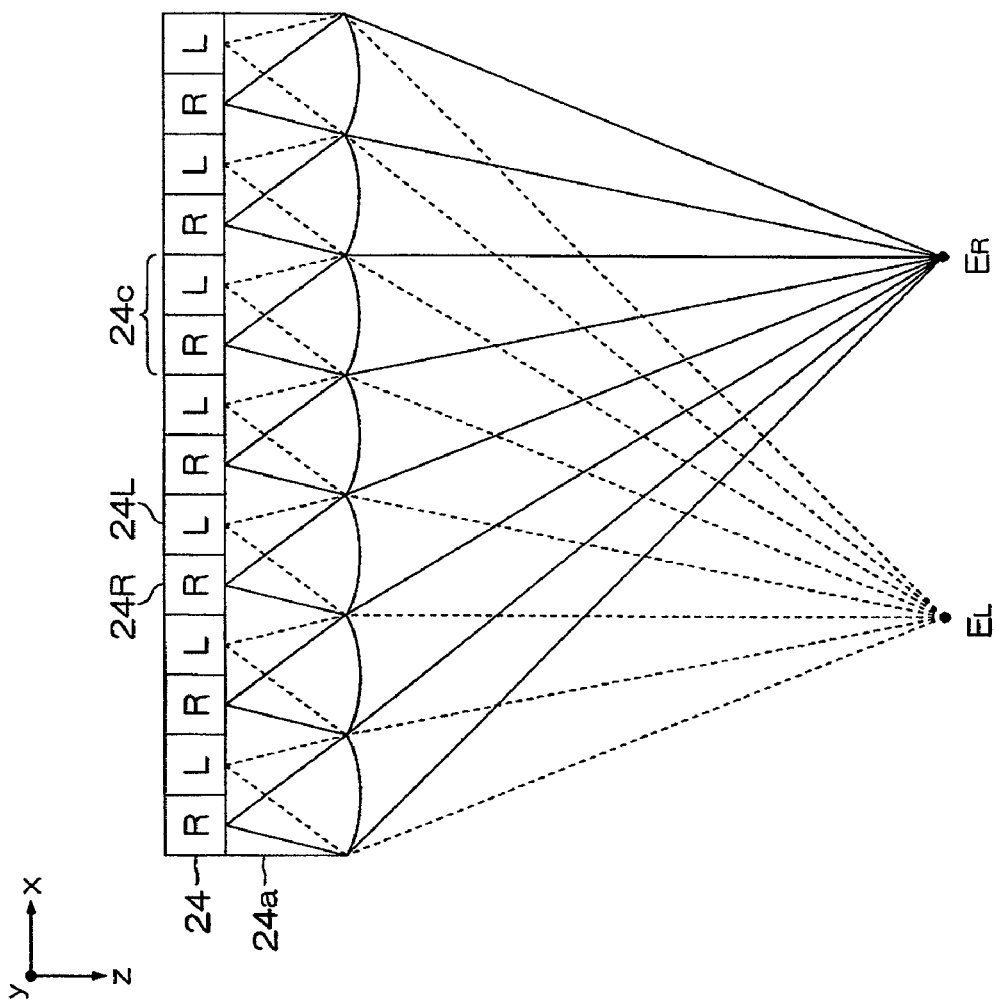
FIG. 11 is a diagram for describing a mechanism which enables stereoscopic vision display on a monitor 24.

FIG. 11 is a diagram for describing a mechanism which enables stereoscopic vision display on the monitor 24. A lenticular lens 24a is placed in a front face of the monitor 24 (a z-axial direction in which observer's viewpoints (left eye EL, right eye ER) exist). The lenticular lens 24a is constructed by putting two or more cylindrical convex lenses in a row in an x-axial direction in FIG. 11.

A display area of a stereoscopic vision image displayed on the monitor 24 is constructed of rectangular image display areas 24R for a right eye, and rectangular image display areas 24L for a left eye. The rectangular image display areas 24R for a right eye and the rectangular image display areas 24L for a left eye each have a shape of a long and slender rectangle (reed-shape) in a y-axial direction of a screen in FIG. 11, and are placed by turns in the x-axial direction in FIG. 11.

Each convex lens of the lenticular lens 24a is formed in a position corresponding to a rectangular collecting image display area 24c, including a set of rectangular image display area 24R for a right eye and rectangular image display area 24L for a left eye, on the basis of an observer's given viewpoint.

Rectangular images for a right eye displayed on the rectangular image display areas 24R for a right eye in monitor 24 are incident into a right eye ER of an observer with an optical refractive action of the lenticular lens 24a in FIG. 11. In addition, rectangular images for a left eye displayed on the rectangular image display areas 24L for a left eye in monitor 24 are incident into a left eye EL of the observer with the optical refractive action of the lenticular lens 24a. Hence, since the right eye of the observer observes only the rectangular images for a right eye, and the left eye of the observer observes only the rectangular images for a left eye, stereoscopic vision becomes possible by right and left parallax by an image for a right eye which is a set of rectangular images for a right eye, and an image for a left eye which is a set of rectangular images for a left eye.

In addition, the monitor 24 includes display elements, which can display both of two-dimensional and three-dimensional images, such as liquid crystal elements, or organic EL elements. The monitor 24 may have such a system that there is spontaneous light or a light source independently, and light quantity is controlled. Furthermore, it may have any system, such as a system by polarization, an anaglyph, and a naked eye system. In addition, it may have a system that liquid crystal elements or organic EL elements are overlapped in a multilayer. The monitor 24 can display a two-dimensional and three-dimensional image by switching a drive mode.

The zoom button 26 is used for a zoom operation of the photographing lenses 14R and 14L, and is constructed of a tele-zoom button which instructs a zoom to a telephoto side, and a wide-zoom button which instructs a zoom to a wide-angle side.

The cross button 28 is provided with being pressable in four directions of up, down, left, and right directions, and a function according to a set state of the camera is assigned to a button in each direction. For example, at the time of photographing, a function of switching ON/OFF of a macro function is assigned to a left button, and a function of switching a strobe mode is assigned to a right button. In addition, a function of changing brightness of the monitor 24 is assigned to an up button, and a function of switching ON/OFF of a self-timer is assigned to a down button. In addition, at the time of reproduction, a function of frame advance is assigned to the left button and a function of frame back is assigned to the right button. In addition, a function of changing brightness of the monitor 24 is assigned to the up button, and a function of deleting a reproducing image is assigned to the down button. In addition, at the time of various setups, a function of moving a cursor displayed on the monitor 24 in a direction of each button is assigned.

The MENU/OK button 30 is used for decision of selection content, an execution instruction (O.K. function) of processing, and the like while being used for a call (MENU function) of a menu screen, and an assigned function is switched according to the set state of the digital camera 10.

On the menu screen, setup of all the adjustment items which the digital camera 10 has is performed, all the adjustment items including an exposure value, a tint, ISO speed, picture quality adjustment such as a record pixel count, setup of the self-timer, switching of a metering system, use/no use of digital zoom, and the like. The digital camera 10 operates according to a condition set on this menu screen.

The DISP button 32 is used for an input of a switching instruction of display content of the monitor 24, and the like, and the BACK button 34 is used for an input of an instruction such as cancellation of input operation.

The portrait/landscape switching button 36 is a button for instructing in which of a portrait mode and a landscape mode photographing is performed. The portrait/landscape detecting circuit 166 detects in which of a portrait mode and a landscape mode photographing is performed, from a state of this button.

The height detecting unit 38 is a circuit for detecting a distance from a reference plane (e.g., ground surface). As shown in FIGS. 1 and 2, the height detecting units 38 are provided in both side faces of the camera body 12 so as to detect height even in any posture of portrait photographing and landscape photographing.

Figure 3:
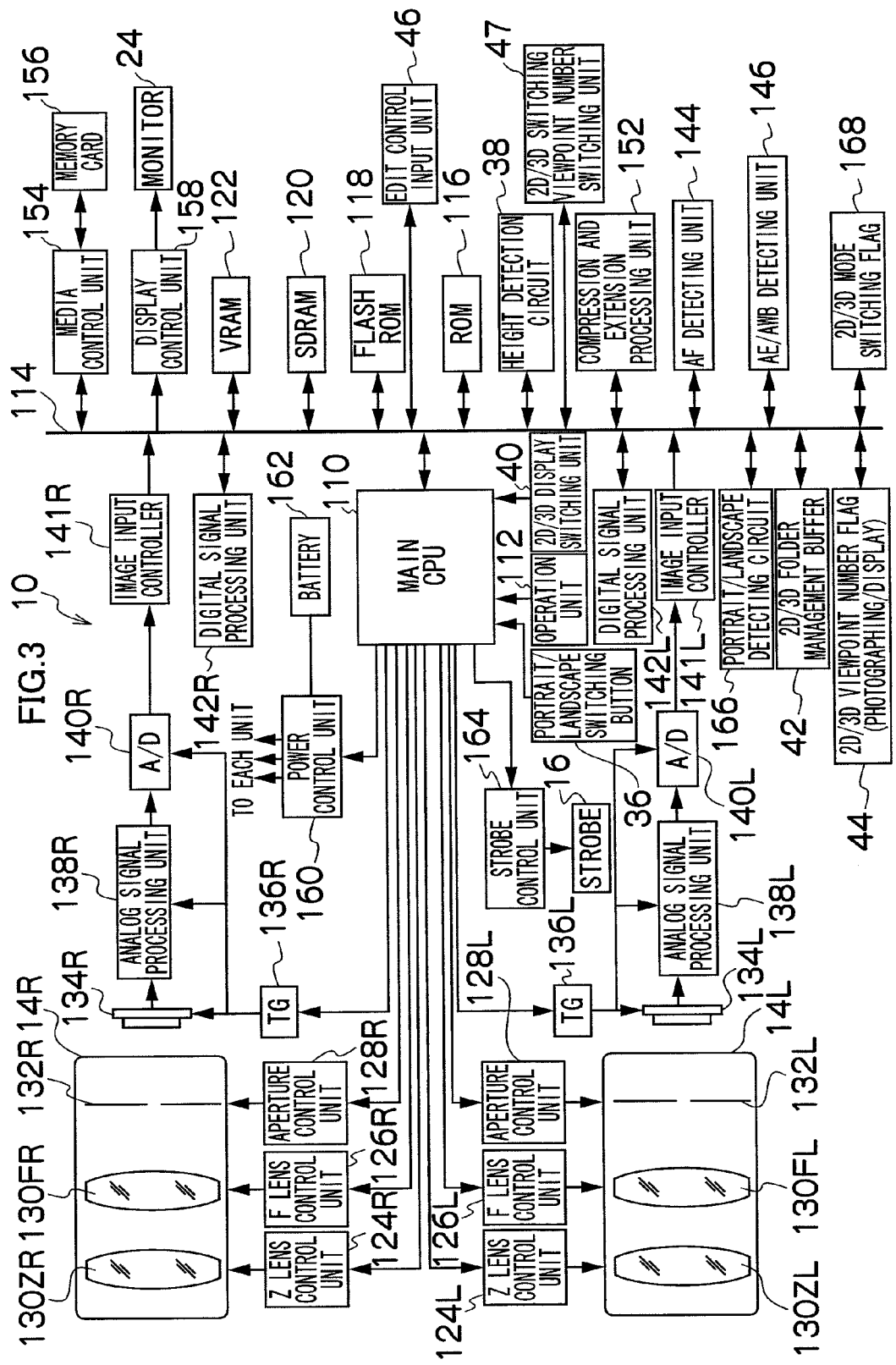
FIG. 3 is a block diagram showing electric constitution of the digital camera 10 shown in FIGS. 1 and 2.

FIG. 3 is a block diagram showing electric constitution of the digital camera 10 shown in FIGS. 1 and 2.

As shown in FIG. 3, the digital camera 10 of this embodiment is constructed so as to acquire an image signal from each of two image pickup systems, and is equipped with a CPU 110, a 2D/3D display switching unit 40, a 2D/3D folder management buffer 42, a 2D/3D viewpoint number flag 44 (photographing/display), an edit control input unit 46, a 2D/3D switching viewpoint number switching unit 47, a thumbnail image creation circuit 50, an operation unit (a shutter button 18, a power supply/mode switch 20, a mode dial 22, a zoom button 26, a cross button 28, a MENU/OK button 30, a DISP button 32, a BACK button 34, a 2D/3D mode switching button 36, and the like) 112, ROM 116, flash ROM 118, SDRAM 120, VRAM 122, photographing lenses 14R and 14L, zoom lens control units 124R and 124L, focus lens control units 126R and 126L, aperture control units 128R and 128L, image pickup elements 134R and 134L, timing generators (TG) 136R and 136L, analog signal processing units 138R and 138L, A/D converters 140R and 140L, image input controllers 141R and 141L, digital signal processing units 142R and 142L, an AF detecting unit 144, an AE/AWB detecting unit 146, a 3D image generation unit 150, a compression and extension processing unit 152, a media control unit 154, a memory card 156, a display control unit 158, a monitor 24, a power control unit 160, a battery 162, a strobe control unit 164, a strobe 16, and the like.

An image pickup device R in a right-hand side in FIG. 1 is mainly constructed of the image taking lens 14R, zoom lens control unit 124R, focus lens control unit 126R, aperture control unit 128R, image pickup element 134R, timing generator (TG) 136R, analog signal processing unit 138R, A/D converter 140R, image input controller 141R, and digital signal processing unit 142R, etc.

An image pickup device L in a left-hand side in FIG. 1 is mainly constructed of the image pickup lens 14L, zoom lens control unit 124L, focus lens control unit 126L, aperture control unit 128L, image pickup element 134L, timing generator (TG) 136L, analog signal processing unit 138L, A/D converter 140L, image input controller 141L, and digital signal processing unit 142L, etc.

The CPU 110 functions as a control device which performs integrated control of operations of a whole camera, and, controls each unit according to a predetermined control program on the basis of an input from the operation unit 112.

The ROM 116 connected through a bus 114 stores a control program, which this CPU 110 executes, various data (an AE/AF control period and the like which are mentioned later) necessary for control, and the like, and flash ROM 118 stores various setup information regarding operations of the digital cameras 10, such as user setup information, etc.

While being used as a calculation work area of the CPU 110, the SDRAM 120 is used as a temporary storage of image data, and the VRAM 12 is used as a temporary storage dedicated for image data for a display.

A pair of right and left photographing lenses 14R and 14L is constructed by including zoom lenses 130ZR and 130ZL, focus lenses 130 FR and 130FL, and apertures 132R and 132L, and are placed with a predetermined gap in the camera body 12.

The zoom lenses 130ZR and 130ZL are driven by zoom actuators not shown, and move back and forth along an optical axis. The CPU 110 controls positions of the zoom lenses by controlling drive of the zoom actuators through the zoom lens control units 124R and 124L, and performs zooming of the photographing lenses 14R and 14L.

The focus lenses 130FR and 130FL are driven by focus actuators not shown, and move back and forth along the optical axis. The CPU 110 controls positions of the focus lenses by controlling drive of the focus actuators through the focus lens control units 126R and 126L, and performs focusing of the photographing lenses 14R and 14L.

The apertures 132R and 132L are constructed of iris stops, and are driven by aperture actuators, not shown, to operate, for example. The CPU 110 controls opening amounts (f-stop numbers) of the apertures 132R and 132L by controlling drive of aperture actuators through the aperture control units 128R and 128L, and controls incident light quantity into the image pickup elements 134R and 134L.

In addition, the CPU 110 drives the right and left photographing lenses 14R and 14L synchronously when driving the zoom lenses 130ZR and 130ZL, focus lenses 130FR and 130FL, and apertures 132R and 132L which construct these photographing lenses 14R and 14L. That is, the right and left photographing lenses 14R and 14L are set at the always same focal length (zoom magnifying power) for focusing to be performed so that the always same subject may be focused. In addition, the apertures are adjusted so as to become the always same incident light quantity (f-stop number).

The image pickup elements 134R and 134L each are constructed of a color CCD with a predetermined color filter array. As for a CCD, many photodiodes are arranged two-dimensionally on its light-receiving surface. Optical images of a subject which are imaged on light-receiving surfaces of CCDs by the photographing lenses 14R and 14L are converted into signal charges according to incident light quantity by these photodiodes. The signal charges stored in respective photodiodes are sequentially read from the image pickup elements 134R and 134L one by one as voltage signals (image signals) corresponding to the signal charges on the basis of driving pulses given by the TGs 136R and 136L according to a command of the CPU 110.

In addition, since these image pickup elements 134R and 134L each are equipped with a function of electronic shutter, exposure time (shutter speed) is controlled by controlling charge storage time to the photodiodes.

Furthermore, in this embodiment, although CCDs are used as image pickup elements, image pickup elements with other constructions, such as CMOS sensors, can be also used.

The analog signal processing units 138R and 138L each include a correlation double sampling circuit (CDS) for removing reset noise (low frequency) included in each of the image signals outputted from the image pickup elements 134R and 134L, and an AGS circuit for amplifying an image signal and controls it in a constant level of amplitude, and hence, amplify each of the image signals outputted from the image pickup elements 134R and 134L while performing correlation double sampling processing.

The A/D converters 140R and 140L convert into digital image signals the analog image signals outputted from the analog signal processing units 138R and 138L.

The image input controllers 141R and 141L fetch the image signals outputted from the A/D converters 140R and 140L to store them in the SDRAM 120.

The digital signal processing units 142R and 142L fetch the image signals stored in the SDRAM 120 according to a command from the CPU 110, and give predetermined signal processing to them to generate a YUV signal which is constructed of a luminance signal Y and color-difference signals Cr and Cb.

Figure 4:
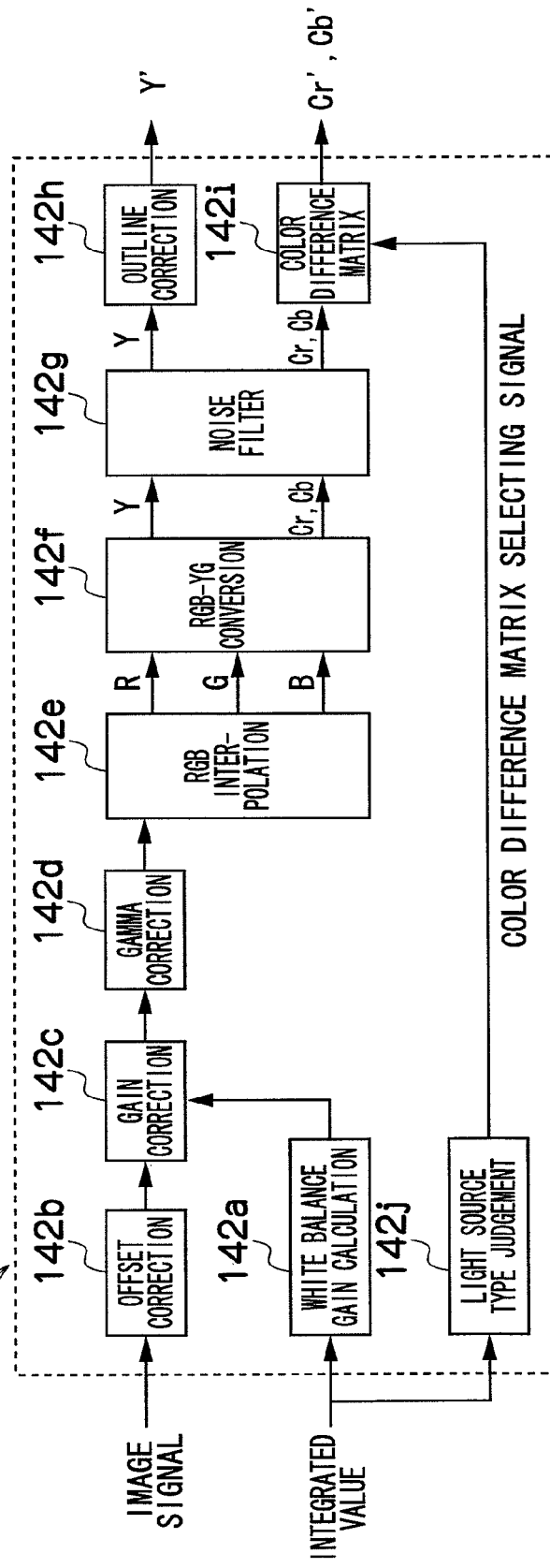
FIG. 4 is a block diagram showing schematic construction of digital signal processing units 142R and 142L.

FIG. 4 is a block diagram showing schematic construction of these digital signal processing units 142R and 142L.

As shown in FIG. 4, the digital signal processing units 142R and 142L each are constructed by being equipped with a white balance gain calculation circuit 142a, an offset correcting circuit 142b, a gain correction circuit 142c, a gamma correction circuit 142d, an RGB interpolating calculation unit 142e, an RGB/YC conversion circuit 142f, a noise filter 142g, a contour correction circuit 142h, a color difference matrix circuit 142i, and a light source type judging circuit 142j.

The white balance gain calculation circuit 142a fetches an integrated value calculated in the AE/AWB detecting unit 146 to calculate a gain value for white balance adjustment.

The offset correcting circuit 142b performs offset processing to an image signal of each color of R, G, and B which are fetched through the image input controllers 141R and 141L.

The gain correction circuit 142c fetches the image signal which is given offset processing to perform white balance adjustment using the gain value calculated in the white balance gain calculation circuit 142a.

The gamma correction circuit 142d fetches the image signal which is given the white balance adjustment to perform gamma correction using a predetermined gamma value.

The RGB interpolating calculation unit 142e performs interpolating calculation of chrominance signals of R, G, and B which are given gamma correction to find three color signals of R, G, and B in respective picture element positions. That is, since only a signal of one color out of R, G, and B is outputted from each pixel in the case of a single plate-type image pickup element, colors which are not outputted are obtained by interpolating calculation from chrominance signals of surrounding pixels. For example, in a pixel which outputs R, how large chrominance signals of G and B in this pixel position become is obtained by the interpolating calculation from G and B signals of surrounding pixels. In this way, since the RGB interpolating calculation is peculiar to a single plate-type image pickup element, when a 3 plate type image pickup element 134 is used, it becomes unnecessary.

The RGB/YC conversion circuit 142f generates a luminance signal Y and color-difference signals Cr and Cb from R, G, and B signals after the RGB interpolating calculation.

The noise filter 142g performs noise reduction processing to the luminance signal Y and color-difference signals Cr and Cb which are generated by the RGB/YC conversion circuit 142f.

The contour correction circuit 142h performs contour correction processing to the luminance signal Y after noise reduction, and outputs a luminance signal Y' given the contour correction.

On the other hand, the color difference matrix circuit 142i performs multiplication of a color difference matrix (C-MTX) to the color-difference signals Cr and Cb after noise reduction to perform color correction. That is, the color difference matrix circuit 142i has two or more kinds of color difference matrices corresponding to light sources, switches color difference matrices to be used according to a kind of a light source which the light source type judging circuit 142j finds, and multiplies the inputted color-difference signals Cr and Cb by the color difference matrix after this switching to output color-difference signals Cr' and Cb' which are given color correction.

The light source type judging circuit 142j fetches the integrated value calculated in the AE/AWB detecting unit 146, judges a light source type, and outputs a color difference matrix selecting signal to the color difference matrix circuit 142i.

In addition, although the digital signal processing unit is constructed in hardware circuits in the digital camera of this embodiment as described above, it is also possible to construct in software the same function as the hardware circuits concerned.

The AF detecting unit 144 fetches an image signal of each color of R, G, and B which are fetched from one side of image input controller 141R, and calculates a focal point evaluation value necessary for AF control. This AF detecting unit 144 includes a high-pass filter which passes only a high frequency component of a G signal, an absolute value conversion processing unit, a focusing area extraction unit which cuts out a signal in a predetermined focusing area set on a screen, and an accumulation unit which integrates absolute value data in the focusing area, and outputs the absolute value data in the focusing area, which is integrated in this accumulation unit, to the CPU 110 as a focal point evaluation value.

The CPU 110 performs focusing to a main subject by searching a position where the focal point evaluation value outputted from this AF detecting unit 144 becomes at local maximum and moving the focus lenses 130FR and 130FL to the position at the time of AF control. That is, at the time of AF control, first, the CPU 110 moves the focus lenses 130FR and 130FL from the close to the infinite, and acquires the focal point evaluation value from the AF detecting unit 144 serially during the moving process to detect the position where the focal point evaluation value becomes at local maximum. Then, it judges that the position where the detected focal point evaluation value is at local maximum is a focused position, and moves the focus lenses 130FR and 130FL to the position. Thereby, the subject (main subject) located in focusing area is focused.

The AE/AWB detecting unit 146 fetches an image signal of each color of R, G, and B which are fetched from one side of image input controller 141R, and calculates an integrated value necessary for AE control and AWB control. That is, this AE/AWB detecting unit 146 divides one screen into two or more areas (for example, 8×8=64 areas), and calculates the integrated value of R, G, and B signals for every divided area.

At the time of AE control, the CPU 110 acquires the integrated value of R, G, and B signals for every area which is calculated in this AE/AWB detecting unit 146, and obtains brightness (photometric value) of the subject to perform exposure setting for obtaining proper exposure. That is, it sets sensitivity, an f-stop number, shutter speed, and necessity of strobe light.

In addition, the CPU 110 applies the integrated value of R, G, and B signals for every area, which is calculated in the AE/AWB detecting unit 146, to the white balance gain calculation circuit 142a and light source type judging circuit 142j of the digital signal processing unit 142 at the time of AWB control.

The white balance gain calculation circuit 142a calculates a gain value for white balance adjustment on the basis of this integrated value calculated in the AE/AWB detecting unit 146.

In addition, the light source type judging circuit 142j detects a light source type on the basis of this integrated value calculated in the AE/AWB detecting unit 146.

The compression and extension processing unit 152 gives compression processing in a predetermined format to the inputted image data according to a command from the CPU 110 to generate compressed image data. Furthermore, the compression and extension processing unit 152 gives extension processing in a predetermined format to the inputted compressed image data according to a command from the CPU 110 to generate uncompressed image data. Moreover, the digital camera 10 of this embodiment performs the compression processing based on the JPEG standard for a still image, and performs the compression processing based on the MPEG2 standard for moving images.

The media control unit 154 controls reading/writing of data to the memory card 156 according to a command from the CPU 110.

The display control unit 158 controls display on the monitor 24 according to a command from the CPU 110. That is, it outputs a predetermined character and drawing information to the monitor 24 while converting the inputted image signal into a video signal (e.g., an NTSC signal, a PAL signal, and a SCAM signal) for displaying it on the monitor 24 according to a command from the CPU 110 and outputting it to the monitor 24.

The power control unit 160 controls power supply from the battery 162 to each unit according to a command from the CPU 110.

The strobe control unit 164 controls light emission of the strobe 16 according to a command from the CPU 110.

The height detecting unit 38 is a circuit for detecting photographing height (distance) from a reference plane (e.g., ground surface).

The portrait/landscape detecting circuit 166 detects whether it is a portrait mode or it is a landscape mode according to a state of the portrait/landscape switching button 36.

A flag which indicates that the camera is in the 2D mode or the 3D mode is set in the 2D/3D mode switching flag 168.

[Operation at Photographing—1]

The following processing is mainly achieved by the CPU 110 executing a predetermined program read into the SDRAM 120 and the like.

As shown in FIG. 6, when photographing is performed in a state of switching to the 2D photographing mode (e.g., step S13 in FIG. 5), the photographed image (2D image) is stored in the 2D image folder, and on the other hand, when photographing is performed in a state of switching to the 3D photographing mode (e.g., step S21 in FIG. 5), the photographed image (3D image) is stored in the 3D image folder.

FIG. 6 shows a state that a total of four folders including the 2D image folder and 3D image folder under the ¥root directory are set. In addition, FIG. 6 shows a state that one file (file name S2_00003) including a 2D image is stored in the 2D image folder. In addition, S2 in a file name is an identifier for identifying an image pickup device (viewpoint) photographing this image, and 00003 in the file name is a consecutive number automatically given for every file creation.

In addition, FIG. 6 shows a state that files (two or more files shown by file name S1_00001 to S1_nnnnn and S2_00001 to S2_nnnnnin FIG. 6) including 3D images (a pair of right and left images, for example, file names S1_00001 and S2_00001) are stored in the 3D image folder. In addition, S1 and S2 in file names are identifiers for identifying image pickup devices (viewpoints) photographing these images, and 00001 to nnnnn in the file names are consecutive numbers automatically given for every file creation.

This file is constructed of an image information tag, a thumb nail (this is also called a thumbnail image), and an image (it is also called a real image or a main image).

The image information tag is attached information to the real image, and includes related information of each image, association information of each image, and the like. In addition, the related information of each image and association information of each image may be recorded as independent files.

As the association information of each image, an identifier (2D/3D is shown in the figure as an example) for identifying whether a real image is a 2D image or a 3D image is recorded. In addition, the related information is recorded also in each image, and it is made that the content can be understood even if an image is moved from a folder to somewhere else by copying and the like.

The related information of each image includes a viewpoint number column, a horizontal viewpoint number column, a vertical viewpoint number column, a viewpoint layout column, a default viewpoint column, a default display mode column, and a 2D/3D mode column.

An identifier for identifying the number of photographing devices which photographed the main image is recorded in the viewpoint number column. An identifier for identifying the number of image pickup devices in the case of using a so-called landscape mode is recorded in the horizontal viewpoint number column. An identifier for identifying the number of image pickup devices in the case of using a so-called portrait mode is recorded in the vertical viewpoint number column.

An identifier for identifying each image pickup device is recorded in order from the left from a camera person's viewpoint in the viewpoint layout column. Although an image pickup system which is left from a camera person's viewpoint is made 1 in the viewpoint layout column, a directional tag may be provided independently. An identifier for identifying the number of image pickup devices is recorded on the default viewpoint column. A default display mode (2D/3D) is recorded in the default display mode column. An identifier for identifying which of a 2D image or a 3D image is a real image is recorded in the 2D/3D mode column.

In addition, what are recorded in the image information tag is not limited to these items. For example, it is also good to record the same items (shutter speed, a lens f-stop number, a compress mode, color space information, a pixel count, manufacturer original information (manufacturer note), and the like) as those of Exif (Exchangeable image file format).

Furthermore, about one image, it is also good to record image attribution information, a thumbnail image, and a real image in one file, or to record them separately.

As described above, 2D images are stored in the 2D image folder, and 3D images are stored in the 3D image folder.

Hence, it becomes possible to search and display quickly an object 2D or 3D image by performing an access per folder. In addition, it becomes easy to perform file management. Furthermore, since an identifier which expresses that the main image in the file is a 2D image or a 3D image is also stored, even if the file is moved, for example, to another folder, it becomes possible to judge whether the main image in the file is a 2D image or a 3D image.

[Operation at Photographing—2]

Subsequently, operations of the digital camera 10 with the above-mentioned construction will be described with referring to drawings.

Figure 5:
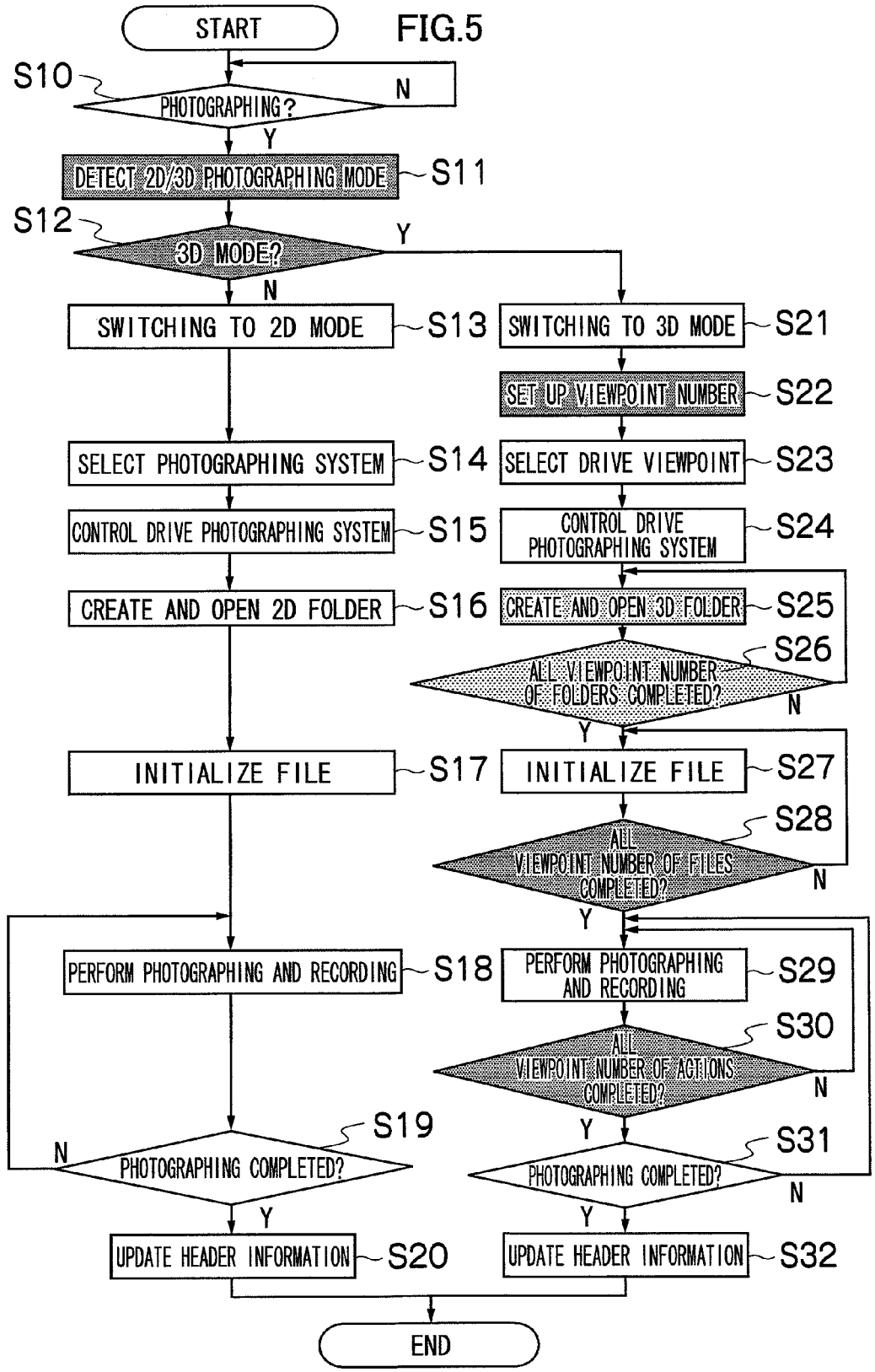
FIG. 5 is a flowchart for describing an operation (operation at the time of photographing) of the digital camera 10 of the first embodiment.

FIG. 5 is a flowchart for describing an operation (operation at image pickup) of the digital camera 10 of the first embodiment.

The following processing is mainly achieved by the CPU 110 executing a predetermined program read into the SDRAM 120 and the like.

When a first step of the shutter button 18 is turned on (step S10: Yes) under a state that either of the 2D photographing mode or 3D photographing mode is set by operation of the mode dial 22, it is detected which of the 2D photographing mode or 3D photographing mode is set according to the state of the mode dial 22 (step S11).

When the 2D photographing mode is detected (step S12: No), it is switched to the 2D mode (step S13). That is, a flag which indicates that the digital camera 10 is in the 2D mode is set in the 2D/3D mode switching flag 168.

Next, an image pickup device (equivalent to a part of image pickup devices of the present invention) driven out of two image pickup devices R and L (equivalent to two or more image pickup devices of the present invention) is selected (step S14). For example, a user operates the operation unit 112 to select the desired image pickup devices R and L. Display for identifying this selected image pickup device R or L may be performed on the monitor 24 or a display unit separately provided in the camera body 12, for example. When doing in this way, it becomes possible to grasp which of the image pickup devices R and L is driven now or by which of the image pickup devices R and L photographing is performed by a user visually identifying this display. As this display, it is conceivable, for example, to blink the identification number of the image pickup device R or L, or a portion equivalent to the image pickup device R or L, which is driven, in a schematic diagram including the two or more image pickup devices R and L, or to highlight the identification number or portion in a different color.

Next, control is performed so as to drive the image pickup device R or L which is selected at step S14 (step S15).

Subsequently, a 2D image folder is created in the memory card 156 and is opened (step S16). The 2D image folder is a folder for recording (storing) a file including a photographed image when photographing is performed in a state that the 2D photographing mode is set. In addition, the 2D image folder is created when not created beforehand, but is not again created when it is created beforehand.

Next, initialization of a file is executed (step S17).

Subsequently, when a second step of the shutter button 18 is turned on (equivalent to a photographing instruction of the present invention), photographing is performed only by the image pickup device R or L which is selected at step S14, and a file including an image (hereinafter a 2D image) photographed by the selected image pickup device R or L is generated and is distributed into the 2D folder automatically to be recorded (stored) in it (step S18).

Then, when the photographing is completed (step S19: Yes), header information is updated (step S20) and the processing is completed.

Next, an operation at the time of the 3D photographing mode being detected at step S12 will be described.

When the 3D photographing mode is detected (step S12: Yes), it is switched to the 3D mode (step S21). That is, a flag which indicates that it is in the 3D mode is set in the 2D/3D mode switching flag 168.

Subsequently, the number of viewpoints (view point number) is set (step S22). For example, in the case of a digital camera equipped with three image pickup devices, a user sets by which image pickup device photographing is performed, by operating the operation unit 112, or the 2D/3D switching viewpoint number switching unit 47. Since it is a digital camera equipped with two image pickup devices R and L in this embodiment, the number of these two image pickup devices R and L is automatically set as the number of viewpoints (=2). For example, it is set in the 2D/3D viewpoint number flag (photographing/display). Display for identifying this set image pickup device R or L may be performed on the monitor 24 or a display unit separately provided in the camera body 12, for example. When doing in this way, it becomes possible to grasp which of the image pickup devices R and L is driven now or by which of the image pickup devices R and L photographing is performed by a user visually identifying this display. As this display, it is conceivable, for example, to blink the identification number of the image pickup device R or L, or a portion equivalent to the image pickup device R or L, which is driven, in a schematic diagram including the two or more image pickup devices R and L, or to highlight the identification number or portion in a different color.

Next, the image pickup devices R and L set at step S22 are selected as drive viewpoints (step S23), and control is performed so as to drive these selected image pickup devices R and L (step S24).

Figure 7:
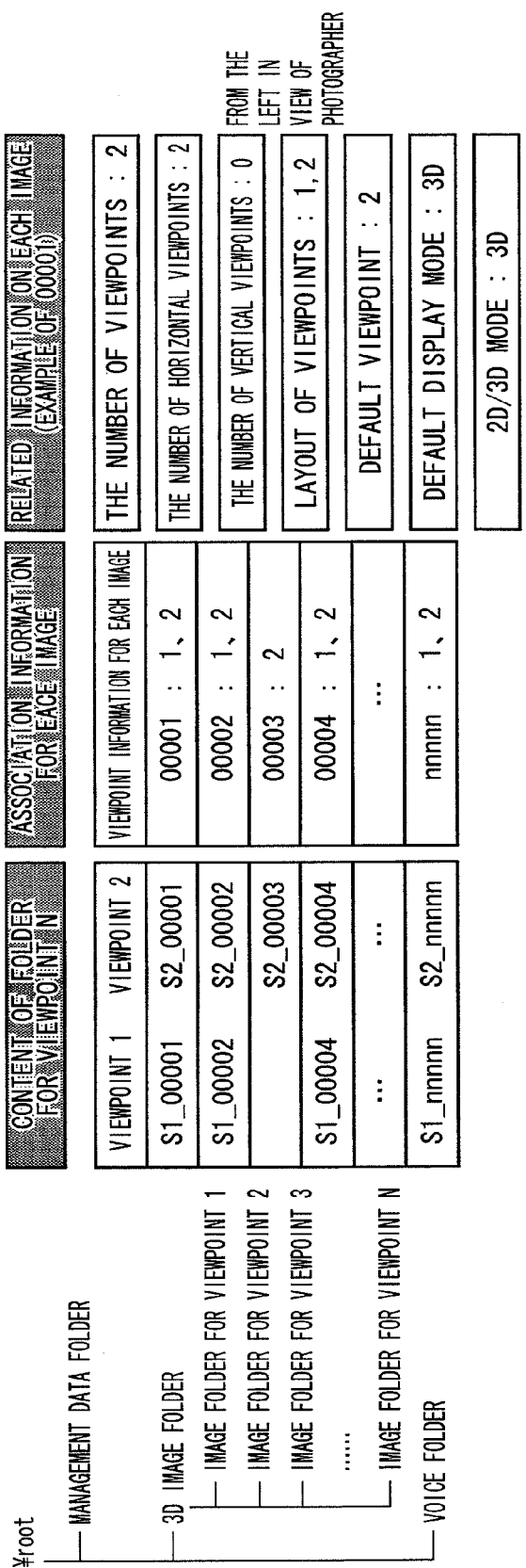
FIG. 7 is an example of image folders for each viewpoint.

Subsequently, a 3D image folder shown in FIG. 7 is created in the memory card 156 and is opened (step S25). The 3D image folder is a folder for recording (storing) a file including a photographed image when photographing is performed in a state that the 3D photographing mode is set. In addition, the 3D image folder is created when not created beforehand, but is not again created when it is created beforehand.

The processing at steps S25 and S26 is repeated by the times of the viewpoint number set at step S22.

Thereby, in this embodiment, two 3D image folders (in FIG. 7, an image folder for a viewpoint 1 and an image folder for a viewpoint 2) are created.

Next, initialization of respective files is executed (step S27, step S28: No).

Then, when a second step of the shutter button 18 is turned on (equivalent to a photographing instruction of the present invention), photographing is performed by the image pickup devices (image pickup devices R and L in this embodiment) selected at step S23, and a file including an image (hereinafter, this is also called a 3D image R) photographed by the image pickup device R (viewpoint 1) and a file including an image (hereinafter, this is also called a 3D image L) photographed by the image pickup device L (viewpoint 2) are generated (step S29). Then, the file including the image photographed by the image pickup device R (viewpoint 1) is automatically distributed to the image folder for the viewpoint 1, and is recorded (stored) in it, and the file including the image (e.g., the 3 image L) photographed by the image pickup device L (viewpoint 2) is automatically distributed to the image folder for the viewpoint 2, and is recorded (stored) in it (step S29: Step S30: No).

Then, when the photographing is completed (step S31: Yes), header information is updated (step S32) and the processing is completed.

Next, structure of a file stored in the 3D image folder as mentioned above will be described. FIG. 7 shows a state that two folders for viewpoints are set under the 3D image folder. In addition, FIG. 7 shows a state that files (two or more files shown by file name S1_00001 to S1_nnnnn in FIG. 7) including 3D images are stored in the image folder for the viewpoint 1, and files (two or more files shown by file name S2_00001 to S2_nnnnn in FIG. 7) including 3D images are stored in the image folder for the viewpoint 2. In addition, S1 and S2 in file names are identifiers for identifying image pickup devices (viewpoints) photographing these images, and 00001 to nnnnn in the file names are consecutive numbers automatically given for every file creation. In addition, the folders for viewpoints may be created under a root directory.

Each file is constructed of an image information tag, a thumb nail (this is also called a thumbnail image), and an image (it is also called a real image or a main image).

The image information tag is attached information to the real image, and includes related information of each image, association information of each image, and the like. In addition, the related information of each image and association information of each image may be recorded as independent files.

As association information of respective images, information on in which folder for a viewpoint each file is stored is stored. FIG. 7 shows that files 00001 to nnnnn include images at two viewpoints, and a file 00003 includes only an image at the viewpoint 2.

The related information of each image includes a viewpoint number column, a horizontal viewpoint number column, a vertical viewpoint number column, a viewpoint layout column, a default viewpoint column, a default display mode column, and a 2D/3D mode column.

An identifier for identifying the number of photographing devices which photographed this image is recorded in the viewpoint number column. An identifier for identifying the number of image pickup devices in the case of using a so-called landscape mode is recorded in the horizontal viewpoint number column. An identifier for identifying the number of image pickup devices in the case of using a so-called portrait mode is recorded in the vertical viewpoint number column.

An identifier for identifying each image pickup device is recorded in order from the left from a camera person's viewpoint in the viewpoint layout column. Although an image pickup system which is left from a camera person's viewpoint is made 1 in the viewpoint layout column, a directional tag may be provided independently. An identifier for identifying the number of image pickup devices is recorded on the default viewpoint column. In addition, although the example of two viewpoints placed in a single dimension is shown, it may be placed two-dimensionally. In that case, when placing, for example, in 3×3, viewpoints are numbered as 11, 12, 13, 21, 22, 23, 31, 32, and 33 from the upper left. When a default viewpoint is a center, number 22 is set. In addition, although the number starts from 1, numbering of setting the first to be 0 may be sufficient. A default display mode (2D/3D) is recorded in the default display mode column. An identifier for identifying which of a 2D image or a 3D image is a real image is recorded in the 2D/3D mode column.

In addition, what are recorded in the image information tag is not limited to these items. For example, it is also good to record the same items (shutter speed, a lens f-stop number, a compress mode, color space information, a pixel count, manufacturer original information (manufacturer note), and the like) as those of Exif (Exchangeable image file format).

Furthermore, about one image, it is also good to record image attribution information, a thumbnail image, and a real image in one file, or to record them separately.

As described above, according to the digital camera 10 of this embodiment, images photographed by two or more image pickup devices R and L (two or more viewpoints) are stored in dedicated folders which are provided for every viewpoint (steps S25 to S31). Hence, it becomes possible to search and display quickly an image at an intended viewpoint by performing an access per folder.

In addition, since related information (association information of respective images) with another viewpoint and default viewpoint information are also stored, a viewpoint switching also becomes easy.

Furthermore, since it can also classify and store in the folders for every viewpoint, a search for every viewpoint becomes easy. For this reason, processing necessary for recording and display of an image is reduced and display for every viewpoint becomes easy.

[Operation at Reproduction—1]

Figure 8:
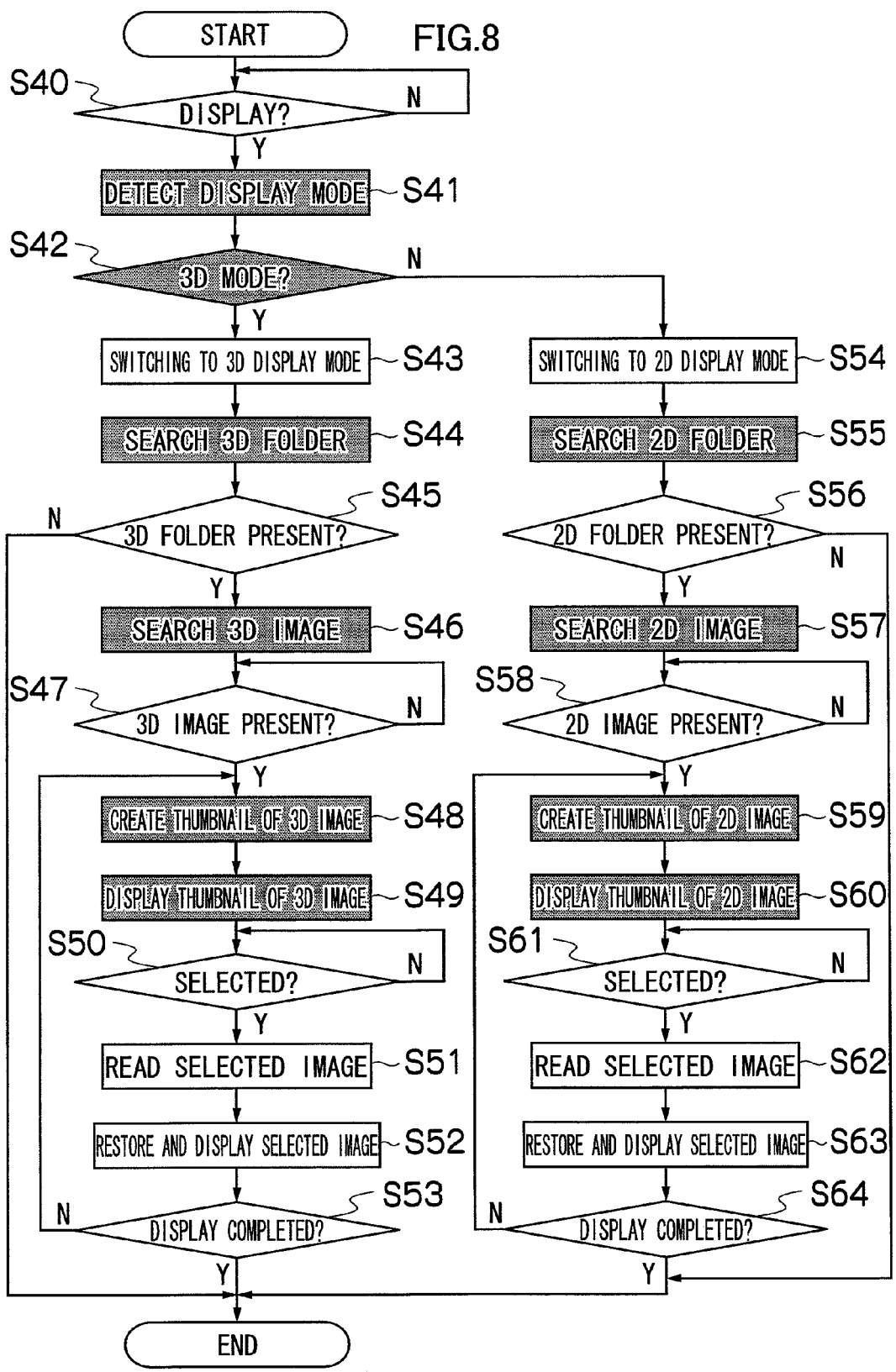
FIG. 8 is a flowchart for describing an operation (operation at the time of reproduction) of the digital camera 10 of the first embodiment.

FIG. 8 is a flowchart for describing an operation (operation at reproduction) of the digital camera 10 of the first embodiment.

The following processing is mainly achieved by the CPU 110 executing a predetermined program read into the SDRAM 120 and the like.

When a user operates the operation unit 112 (2D/3D display switching unit 40) to select which of 2D and 3D images the user intends to display (step S40), it is detected which display mode is selected (step S41).

When a 3D mode is detected (step S42: Yes), the display mode is switched to the 3D display mode (step S43). That is, a flag which indicates that the display mode is in the 3D mode is set in the 2D/3D mode switching flag 168.

Next, the 3D image folder shown in FIG. 6 is searched (step S44), and when the 3D image folder can be searched (step S45: Yes), a file including a 3D image in the 3D image folder is searched (step S46). This processing is performed using, for example, a 2D/3D folder management buffer 42 and the like. Then, when a file including a 3D image can be searched (step S47: Yes), a thumbnail image is extracted or created from the searched file (one or more files may be searched) (step S48) and the extracted thumbnail image (one or more thumbnail may be extracted) is displayed on the monitor 24 in a predetermined format (step S49).

When a user operates the operation unit 112 to select one of thumbnail images from the displayed thumbnail images (step S50: Yes), a main image is read from the file corresponding to the selected thumbnail image (step S51) to be displayed as a 3D image (step S52). That is, according to a content of the 2D/3D mode switching flag 168 (a flag which indicates that the display mode is in the 3D mode is set), the display control unit 158 and the like are controlled so that a right image (e.g., an image of the photographing system 1 in the diagram) may be displayed on a rectangular image display area 24R for a right eye in the monitor 24, and a left image (e.g., an image of the photographing system 2 in the diagram) may be displayed on a rectangular image display area 24L for a left eye. In this case, a user visually identifies the displayed images as a three-dimensional image.

The processing of the above-mentioned steps S48 to S53 is repeated until display is completed (step S53: No).

As described above, since a file (image) is read from the 3D image folder which is specific to 3D images when the 3D mode is detected at step S42, selection becomes easy, and further, it becomes possible also to quickly perform display (display for selection) of a thumbnail image or a main image. In addition, it becomes possible to also perform selection of an image easily.

Next, an operation at the time of the 2D mode being detected at step S42 will be described.

When a 2D mode is detected (step S42: No), the display mode is switched to the 2D display mode (step S54). That is, a flag which indicates that the display mode is in the 2D mode is set in the 2D/3D mode switching flag 168.

Next, the 2D image folder shown in FIG. 6 is searched (step S55), and when the 2D image folder can be searched (step S56: Yes), a file including a 2D image in the 2D image folder is searched (step S57). Then, when the file including a 2D image can be searched (step S58: Yes), a thumbnail image is extracted or created from the searched file (one or more files may be searched) (step S59) and the extracted thumbnail image (one or more thumbnail may be extracted) is displayed on the monitor 24 in a predetermined format (step S60).

When a user operates the operation unit 112 to select one of thumbnail images from the displayed thumbnail images (step S61: Yes), a main image is read from the file corresponding to the selected thumbnail image (step S62) to be displayed as a 2D image (step S63). That is, according to a content of the 2D/3D mode switching flag 168 (a flag which indicates that it is in the 2D mode is set), the display control unit 158 and the like are controlled so that the same image (e.g., an image 1 in the diagram) may be displayed on the rectangular image display area 24R for a right eye in the monitor 24, and on the rectangular image display area 24L for a left eye. In this case, a user visually identifies the displayed images as a normal (2D) image, not a three-dimensional image.

The processing of the above-mentioned steps S59 to S63 is repeated until display is completed (step S64: No).

As described above, according to the digital camera 10 of this embodiment, 2D images are stored in the 2D image folder, and 3D images are stored in the 3D image folder.

Hence, it becomes possible to search and display quickly an object 2D or 3D image by performing an access per folder. In addition, it becomes easy to perform file management. Furthermore, since an identifier which expresses that it is a 2D image or a 3D image is also stored, even if it is moved, for example, to another folder, it becomes possible to judge whether it is a 2D image or a 3D image. Furthermore, since images are classified and stored in 2D or 3D image folder, a search of a 3D image becomes easy. For this reason, it becomes possible to reduce processing necessary for recording and displaying an image, and to reduce time to the display.

Furthermore, since an image is searched from a 2D or 3D image folder (step S44 or S55) according to the display mode set in a 2D or 3D display mode (step S42), in the case of 3D display, it is possible to display the 3D image folder preferentially (step S48, and the like). For this reason, time and effort of switching becomes unnecessary.

[Operation at Reproduction—2]

Figure 9:
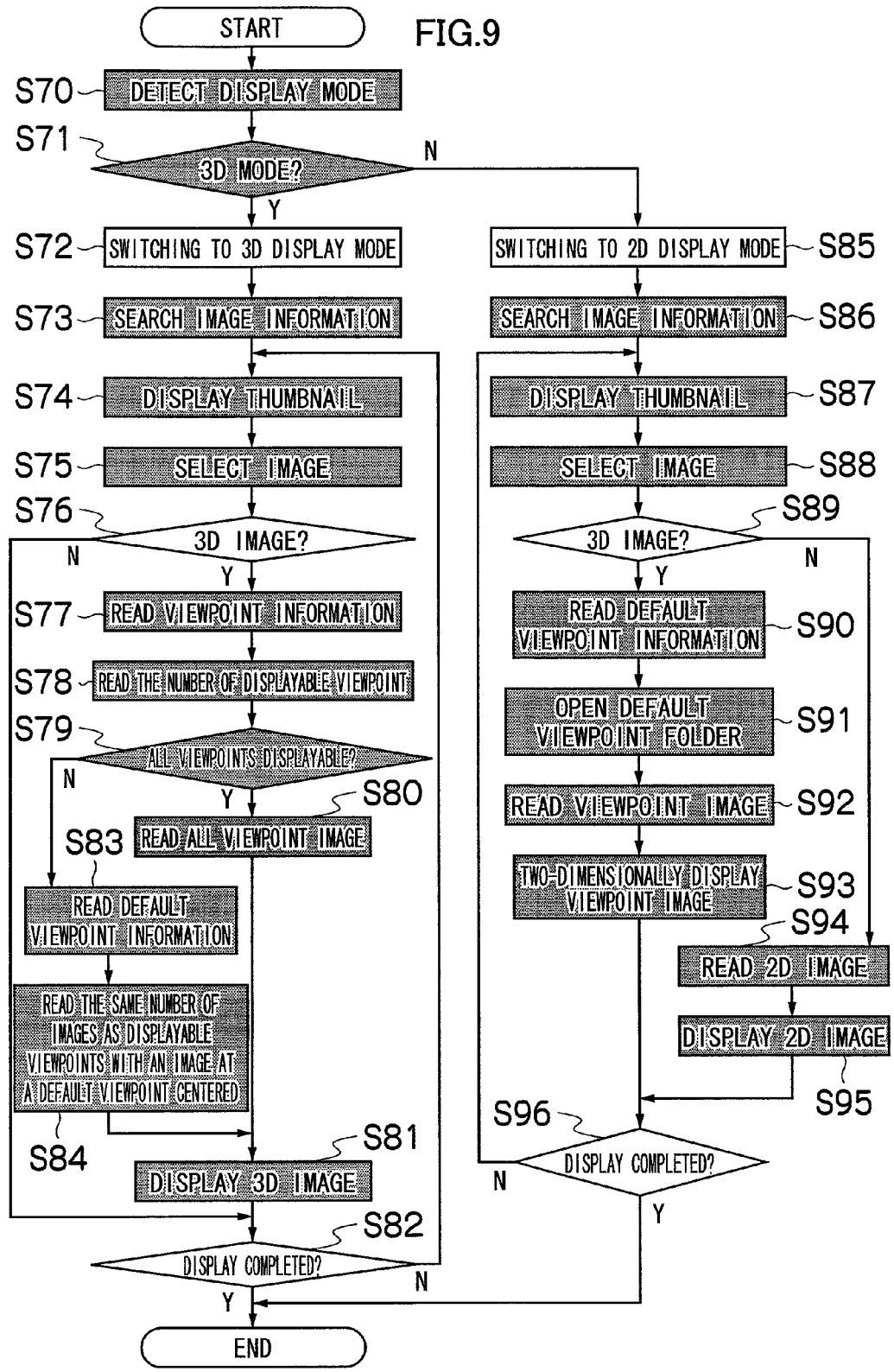
FIG. 9 is a flowchart for describing an operation (operation at the time of reproduction) of the digital camera 10 of the first embodiment.

FIG. 9 is a flowchart for describing an operation (operation at the time of reproduction) of the digital camera 10 of the first embodiment.

The following processing is mainly achieved by the CPU 110 executing a predetermined program read into the SDRAM 120 and the like.

It is detected which display mode is selected (step S70).

When a 3D mode is detected (step S70: Yes), the display mode is switched to the 3D display mode (step S72). That is, a flag which indicates that the display mode is in the 3D mode is set in the 2D/3D mode switching flag 168.

Next, image information is searched (step S73). For example, a file including an image in each folder under the 3D image folder shown in FIG. 7 is searched. Then, when a file including the image can be searched, a thumbnail image is extracted or created from the searched file (one or more files may be searched) and the extracted thumbnail image (one or more thumbnail may be extracted) is displayed on the monitor 24 in a predetermined format (step S74).

When a user operates the operation unit 112 to select one of thumbnail images from the displayed thumbnail images (step S75), it is judged whether a file corresponding to the selected thumbnail image is a 3D image (step S76).

If the file corresponding to the selected thumbnail image is a 3D image (step S76: Yes), viewpoint information and the number of displayable viewpoints (displayable viewpoint number) corresponding to the file are read (steps S77 and S78), and it is judged whether all the viewpoints can be displayed (step S79). Since images at all the viewpoints may not be displayable depending on size of the monitor 24 of the digital camera, and the like, a displayable viewpoint number is set for every digital camera, and the processing at step S79 is performed.

Then, when judged that all the viewpoints are displayable (step S79: Yes), the images at all the viewpoints are read from image folders of viewpoints concerned on the basis of the viewpoint information read at step S77 (step S80) to be displayed as a 3D image (step S81). That is, according to a content of the 2D/3D mode switching flag 168 (a flag which indicates that the display mode is in the 3D mode is set), the display control unit 158 and the like are controlled so that a right image (e.g., an image of the photographing system 1 in the diagram) may be displayed on a rectangular image display area 24R for a right eye in the monitor 24, and a left image (e.g., an image of the photographing system 2 in the diagram) may be displayed on a rectangular image display area 24L for a left eye. In this case, a user visually identifies the displayed images as a three-dimensional image.

The processing of the above-mentioned steps S74 to S81 is repeated until display is completed (step S82: No).

On the other hand, when judged that all the viewpoints are not displayable (step S79: No), a default viewpoint is read (step S83), and the same number of images as displayable viewpoints with the read default viewpoint centered are read from image folders of viewpoints concerned to be displayed as a 3D image similarly to the above (step S81).

As described above, since a file (image) is read from the 3D image folder which is specific to 3D images when the 3D mode is detected at step S42, selection becomes easy, and further, it becomes possible also to quickly perform display (display for selection) of a thumbnail image or a main image. In addition, it becomes possible to also perform selection of an image easily.

Next, an operation at the time of the 2D mode being detected at step S71 will be described.

When the 2D mode is detected (step S71: No), the display mode is switched to the 2D display mode (step S85). That is, a flag which indicates that the display mode is in the 2D mode is set in the 2D/3D mode switching flag 168.

Next, image information is searched (step S86). For example, a file including an image in each folder under the 3D image folder shown in FIG. 7 is searched. Then, when a file including the image can be searched, a thumbnail image is extracted or created from the searched file (one or more files may be searched) and the extracted thumbnail image (one or more thumbnails may be extracted) is displayed on the monitor 24 in a predetermined format (step S87).

When a user operates the operation unit 112 to select one of thumbnail images from the displayed thumbnail images (step S88: Yes), Next, it is judged whether a file corresponding to the selected thumbnail image is a 3D image (step S89).

If the file corresponding to the selected thumbnail image is a 3D image (step S89: Yes), a default viewpoint is read (step S90), an image folder of the default viewpoint read is opened (step S91), and the image concerned is read from the opened image folder of the viewpoint (step S92) to be displayed as a 2D image (step S93). That is, the display control unit 158 and the like are controlled so that the same image (the image read at step S92) may be displayed on the rectangular image display area 24R for a right eye and rectangular image display area 24L for a left eye of the monitor 24. In this case, a user visually identifies the displayed images as a normal image, not a three-dimensional image.

If the file corresponding to the selected thumbnail image is a 2D image (step S89: No), a main image is read from the file corresponding to the selected thumbnail image (step S94) to be displayed as a 2D image similarly to the above (step S95).

The processing of the above-mentioned steps S87 to S95 is repeated until display is completed (step S96: No).

As described above, according to the digital camera 10 of this embodiment, images photographed by two or more image pickup devices (two or more viewpoints) are stored in dedicated folders which are provided for every viewpoint.

Hence, it becomes possible to search and display quickly an image at an object viewpoint by performing an access per folder.

In addition, since this aspect also stores related information with another viewpoint and default viewpoint information, a viewpoint switching also becomes easy.

Furthermore, since it can also classify and store in the separate folders for each viewpoint, a search for every viewpoint becomes easy. For this reason, processing necessary for recording and display of an image is reduced and display for every viewpoint becomes easy.

Moreover, in the case of the 2D mode (step S71: No), since an image at a default viewpoint is read and displayed (steps S90 to S93), time and effort of selection is unnecessary, and it is possible to easily display an image which a camera person or an editor wants to show.

In addition, since it is possible to read and display the same number of images as displayable viewpoints with a default viewpoint centered in the case of a 3D mode (step S71: Yes) (steps S83, S84, and S81), selection is unnecessary and it becomes possible to display them easily.

[Operation at Editing]

Figure 10:
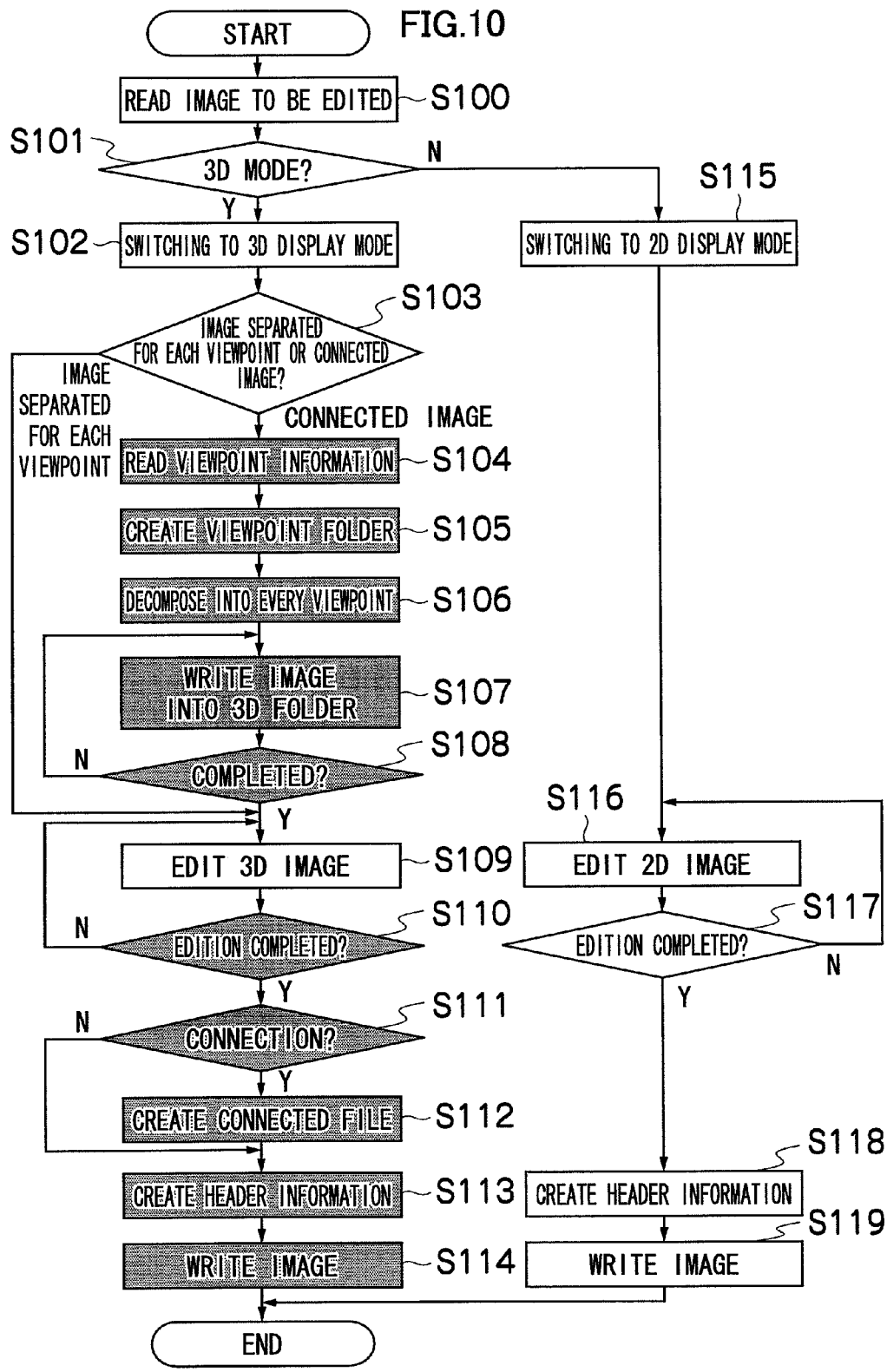
FIG. 10 is a flowchart for describing an operation (operation at the time of edit) of the digital camera 10 of the first embodiment.

FIG. 10 is a flowchart for describing an operation (operation at editing) of the digital camera 10 of the first embodiment.

The following processing is mainly achieved by the CPU 110 executing a predetermined program read into the SDRAM 120 and the like.

When an image of an editing object is instructed by operation of the operation unit 112, the image concerned is read (step S100).

When the read image is in the 3D mode (step S101: Yes), the digital camera 10 is switched to the 3D display mode (step S102). That is, a flag which indicates that the digital camera 10 is in the 3D mode is set in the 2D/3D mode switching flag 168.

Next, it is judged which of an image for every viewpoint and a connected image the image read at step S100 is (step S103).

When the image read at step S100 is a connected image (step S103: connected image), viewpoint information corresponding to the file is read (step S104), and the viewpoint folder concerned is created (step S105).

Then, images of respective viewpoints included in the connected images are stored in the viewpoint folders concerned, respectively (step S106, S107, and S108).

Next, the 3D images are edited by operation of the operation unit 112 or edit control input unit 46 (step S109).

When this edit is completed (step S110: Yes) and an instruction to connect 3D images after edit is inputted by operation of the operation unit 112 (step S111: Yes), a concatenation file is created (step S112).

Then, header information is created (step S113), the images after edit are written (step S114), and the processing is completed.

Next, an operation at the time of the 2D mode being detected at step S101 will be described.

When the read image is in the 2D mode (step S101: No), the digital camera 10 is switched to the 2D display mode (step S102). That is, a flag which indicates that the digital camera 10 is in the 2D mode is set in the 2D/3D mode switching flag 168.

Next, the 2D image is edited by operation of the operation unit 112 (step S116).

When this edit is completed (step S117: Yes), header information is created (step S118), the image after edit is written (step S119), and the processing is completed.

As described above, according to the digital camera 10 of this embodiment, since separate folders for every viewpoint are prepared and then images are edited (steps S105 to S110), image confirmation for every viewpoint and edit such as control of depth feel become easy.

(Modified Example)

Next, a modified example of the digital camera 10 of this embodiment will be described.

In this embodiment, as shown in FIG. 1, the example that the digital camera 10 equipped with two image pickup devices R and L is described, but the present invention is not limited to this.

For example, the digital camera 10 may be equipped with three or more photographing devices. In addition, photographing lenses which construct a photographing device do not need to be placed in a single horizontal row, as shown in FIG. 1. For example, when three image pickup devices are provided, respective photographing lenses may be placed in positions corresponding to respective vertexes of a triangle. Similarly, when four image pickup devices are provided, respective photographing lenses may be placed in positions corresponding to respective vertexes of a square.

In addition, in this embodiment, for example, stereography, and multi-viewpoint, or omnidirectional photographing may be performed, and a file including an image obtained in consequence of the photographing may be recorded.

Furthermore, in this embodiment, for example, at the time of a 3D still image photographing mode, a still image for stereoscopic vision observed by an anaglyph system, a stereoscope system, a parallel method, an intersecting method, or the like is generated, and at the time of 3D moving image photographing mode, 3D moving images in time-sharing system (TSS) may be generated. About this kind of 3D image generation method, since it is a publicly-known technique, a description about its specific generation method is omitted here.

In addition, in this embodiment, although reference is not made particularly about voice recording, of course, it is also possible to make voice recording possible.

The above-mentioned embodiments are only mere exemplification at all points. The present invention is not restrictively interpreted by these descriptions. The present invention can be performed in other various forms without deviating from its spirit or main features.

What is claimed is:

1. An image recording apparatus, comprising:
   a storage device configured to classify and store a two dimensional (2D) image file and a three dimensional (3D) image file including a plurality of viewpoint image files each corresponding to a plurality of viewpoints, into a 2D image folder and a 3D image folder, respectively;
   a display device configured to display a two dimensional (2D) image and a three dimensional (3D) image;
   a display mode switching device configured to switch a display mode to a 2D display mode for displaying a 2D image on the display device or a 3D display mode for displaying a 3D image on the display device, on the basis of a user input;
   a first search device configured to search, at the time of the 2D display mode, a 2D image file stored in the 2D image folder, and output a first reduced image corresponding to the searched 2D image file to the display device;
   a second search device configured to search, at the time of the 3D display mode, a 3D image file stored in the 3D image folder, and output a second reduced image corresponding to the searched 3D image file to the display device;
   a selecting device configured to select the first or second reduced image displayed on the display device, on the basis of a user input;
   a first display control device configured to read out the 2D image file corresponding to the selected first reduced image, and display a two dimensional image of the read 2D image file on the display device, at the time of the 2D display mode; and
   a second display control device configured to read out the 3D image file corresponding to the selected second reduced image, and display a three dimensional image of the read 3D image file on the display device, at the time of the 3D display mode.

2. An image recording method executed by an image recording apparatus, comprising:
   classifying and storing a two dimensional (2D) image file and a three dimensional (3D) image file including a plurality of viewpoint image files each corresponding to a plurality of viewpoints, into a 2D image folder and a 3D image folder which are included in a storage device of the image recording apparatus, respectively;
   switching a display mode of the image recording apparatus to a 2D display mode for displaying a 2D image on a display device of the image recording apparatus and a 3D display mode for displaying a 3D image on the display device, on the basis of a user input;
   searching, at the time of the 2D display mode, a 2D image file stored in the 2D image folder, and outputting a first reduced image corresponding to the searched 2D image file to the display device;
   searching, at the time of the 3D display mode, a 3D image file stored in the 3D image folder, and outputting a second reduced image corresponding to the searched 3D image file to the display device;
   selecting the first or second reduced image displayed on the display device, on the basis of a user input;
   reading out the 2D image file corresponding to the selected first reduced image, and displaying a two dimensional image of the read 2D image file on the display device, at the time of the 2D display mode; and
   reading out the 3D image file corresponding to the selected second reduced image, and displaying a three dimensional image of the read 3D image file on the display device, at the time of the 3D display mode.

3. The image recording method according to claim 2, further comprising:
   switching a photographing mode of the image recording apparatus to a 2D photographing mode for photographing a two dimensional (2D) image or a 3D photographing mode for photographing a three dimensional (3D) image;
   confirming presence of a 2D image folder and a 3D image folder, and creating the 2D image folder or the 3D image folder if the folder does not exist; and
   storing a 2D image file including the 2D image photographed at the time of the 2D photographing mode and a 3D image file including the 3D image photographed at the time of the 3D photographing mode into the 2D and 3D image folders, respectively.

4. The image recording method according to claim 2, further comprising:
   reading a number of displayable viewpoints, which depends on the display device, in the case of the 3D display mode;

reading and displaying viewpoint image files of all viewpoints of the read 3D image file when all viewpoint image file are determined to be displayable by the image recording apparatus; and reading and displaying the same number of viewpoint image files of the read 3D image file as the number of displayable viewpoints with a viewpoint image file at the default viewpoint centered when all viewpoint image file are not determined to be displayable by the image recording apparatus.

5. The image recording method according to claim 2, comprising:

selecting an image to be edited;

confirming whether the selected image is separately stored for each viewpoint in a plurality of viewpoint image folders;

separately storing one file into the plurality of folders for each viewpoint when the file is not separated for each viewpoint;

reading images in the viewpoint image folders for each viewpoint at the time of editing and writing the images after the editing;

integrating the images in the plurality of viewpoint image folders for each viewpoint into one file to record the file in a recording medium at the time of an end of the editing; and writing header information of the file.

6. The image recording method according to claim 2, further comprising storing a plurality of viewpoint image files corresponding to viewpoints of the 3D image files to a plurality of viewpoint image folders.

7. An image recording method executed by an image recording apparatus, comprising:

(a) storing a two dimensional (2D) image and a three dimensional (3D) image which includes a plurality of viewpoint image files each corresponding to a plurality of viewpoints and includes default viewpoint information;

(b) switching a display mode of the image recording device to a 2D display mode for displaying a 2D image on a display device of the image recording apparatus and a 3D display mode for displaying a 3D image on the display device, on the basis of a user input;

(c) searching a 2D and 3D image files, and outputting a first reduced image and a second reduced image which correspond to the searched 2D and 3D image files to the display device, respectively;

(d) selecting the first or second reduced image displayed on the display device on the basis of a user input;

(e) selecting the first or second reduced image displayed on the display device, on the basis of a user input;

(f) reading out the 2D image file corresponding to the selected first reduced image, and displaying a two dimensional image of the read 2D image file on the display device, at the time of the 2D display mode;

(g) reading out the 3D image file corresponding to the selected second reduced image, and displaying a three dimensional image of the read 3D image file on the display device, at the time of the 3D display mode, the step (g) including:

reading the default viewpoint information of the read 3D image file;

reading a number of displayable viewpoints;

reading and displaying an 3D image by using all viewpoint image files of the read 3D image file when all viewpoint image files are displayable; and reading and displaying an 3D image by using the same number of viewpoint image files of the read 3D image file as the displayable viewpoints with a viewpoint image file corresponding to the default viewpoint centered when all viewpoint image files are not displayable, at the time of the 3D display mode.

8. The image recording method according to claim 7, comprising:

reading default viewpoint information of the read 3D image file; and reading and displaying the viewpoint image file of the read 3D image file corresponding to a default viewpoint in the case of a 2D display mode.

9. The image recording method according to claim 7, comprising:

selecting an image to be edited;

confirming whether the selected image is separately stored for each viewpoint in a plurality of viewpoint image folders;

separately storing one file into the plurality of folders for each viewpoint when the file is not separated for each viewpoint;

reading images in the viewpoint image folders for each viewpoint at the time of editing and writing the images after the editing;

integrating the images in the plurality of viewpoint image folders for each viewpoint into one file to record the file in a recording medium at the time of an end of the editing; and writing header information of the file.

10. The image recording method according to claim 7, further comprising storing the 2D image file and the 3D image file to a 2D image folder and a 3D image folder, respectively.

11. The image recording method according to claim 10, further comprising storing a plurality of viewpoint image files corresponding to viewpoints of the 3D image files to a plurality of viewpoint image folders.

12. An image recording apparatus, comprising:

a storage device configured to store a two dimensional (2D) image and a three dimensional (3D) image which includes a plurality of viewpoint image files each corresponding to a plurality of viewpoints and includes default viewpoint information;

a display device configured to be able to display a two dimensional (2D) image and a three dimensional (3D) image;

a display mode switching device configured to switch a display mode to a switch 2D display mode for displaying a 2D image on the display device and a 3D display mode for displaying a 3D image on the display device, on the basis of a user input;

a search device configured to search a 2D and 3D image files, and output a first reduced image and a second reduced image which correspond to the searched 2D and 3D image files to the display device, respectively;

a selecting device configured to select the first or second reduced image displayed on the display device, on the basis of a user input;

a first display control device configured to read out the 2D image file corresponding to the selected first reduced image, and display a two dimensional image of the read 2D image file on the display device, at the time of the 2D display mode; and a second display control device configured to read out the 3D image file corresponding to the selected second reduced image, and display a three dimensional image of the read 3D image file on the display device, at the time of the 3D display mode, wherein the second display control device reads the default viewpoint information of the read 3D image file, reads a number of displayable viewpoints, at the time of the 3D display mode, the second display control device reads and displays an 3D image by using all viewpoint image files of the read 3D image file when all viewpoint image files are displayable, and the second display control device reads and displays an 3D image by using the same number of viewpoint image files of the read 3D image file as the displayable viewpoints with a viewpoint image file corresponding to the default viewpoint centered when all viewpoint image files are not displayable.

13. The image recording apparatus according to claim 12, wherein a storage device includes a 2D image folder in which a 2D image file is stored and a 3D image folder in which a 3D image file is stored.

* * * * *